US009623499B2

(12) United States Patent  
Beck et al.

(10) Patent No.: US 9,623,499 B2
(45) Date of Patent: Apr. 18, 2017

(54) FOLDABLE BOW SAW

(71) Applicant: Agawa Canyon Inc., Toronto (CA)

(72) Inventors: Graham N. Beck, Toronto (CA); Henry J. Samulski, Uxbridge (CA); Arthur H. Watson, Toronto (CA)

(73) Assignee: AGAWA CANYON INC., Toronto (CA)

( * ) Notice: Subject to any disclaimer, the term of this patent is extended or adjusted under 35 U.S.C. 154(b) by 123 days.

(21) Appl. No.: 14/732,396

(22) Filed: Jun. 5, 2015

(65) Prior Publication Data

US 2016/0016238 A1 Jan. 21, 2016

Related U.S. Application Data

(60) Provisional application No. 62/009,014, filed on Jun. 6, 2014.

(51) Int. Cl.
B23D 51/03 (2006.01)
B23D 51/01 (2006.01)
B27B 21/02 (2006.01)
B27B 21/06 (2006.01)
B23D 51/12 (2006.01)

(52) U.S. Cl.
CPC ............. *B23D 51/03* (2013.01); *B23D 51/01* (2013.01); *B23D 51/125* (2013.01); *B27B 21/02* (2013.01); *B27B 21/06* (2013.01)

(58) Field of Classification Search
CPC ...... B23D 51/03; B23D 51/01; B23D 51/125; B27B 21/02; B27B 21/06

USPC ................................ 30/506–519; D8/96, 97
See application file for complete search history.

(56) References Cited

U.S. PATENT DOCUMENTS

| | | | | |
|---|---|---|---|---|
| 1,471,214 A | * | 10/1923 | Sieben | B23D 49/12 30/510 |
| 1,517,827 A | * | 12/1924 | De Grado | B23D 51/125 30/511 |
| 2,309,816 A | * | 2/1943 | Allen | B23D 51/03 30/512 |
| 2,725,911 A | * | 12/1955 | Glenn | B23D 51/125 30/506 |
| 2,930,420 A | | 3/1960 | Brion | |
| 3,191,648 A | | 6/1965 | Dustrude | |
| 3,245,445 A | | 4/1966 | Herman at al. | |
| 4,499,936 A | * | 2/1985 | Nilsson | B23D 51/03 30/512 |

(Continued)

Primary Examiner — Ghassem Alie
(74) Attorney, Agent, or Firm — Thorpe North & Western LLP

(57) ABSTRACT

A foldable bow saw movable between a functional saw condition and a folded packable condition includes a handle arm, a top bar, a short arm, a saw blade, and a lever arm, all pivotally connected one to the other with an end of the handle arm and an end of the lever arm forming free, unconnected ends of the assembly. The free end of the handle arm includes a connecting fulcrum surface adapted to removably mate with a fulcrum surface receiver in the lever arm. Rotation of the lever arm in a locking direction about the fulcrum surface moves the pivotal connection of the lever arm to the saw blade to a tensioned functional saw condition. Rotation of the lever arm in an unlocking direction allows the fulcrum surface to be removed from the fulcrum surface receiver and the assembly to be folded to the packable condition.

19 Claims, 24 Drawing Sheets

(56) References Cited

U.S. PATENT DOCUMENTS

| | | |
|---|---|---|
| 4,580,344 A | 4/1986 | Jinghage et al. |
| 5,208,986 A | 5/1993 | Ryon et al. |
| 5,440,816 A | 8/1995 | Dustrude |
| 6,898,858 B1 * | 5/2005 | Spell ................. B27B 21/02 30/507 |
| 8,266,806 B2 * | 9/2012 | Holmroos ............ B23D 51/03 30/512 |

* cited by examiner

FOLDABLE BOW SAW

BACKGROUND

Field of the Invention

The present invention relates to foldable bow saws or collapsible saws, sometimes referred to as pack saws.

Related Art

Campers and outdoor enthusiasts alike need a portable—yet effective—crosscut saw to cut firewood, de-limb trees, and/or clear trails of branches and boughs. As well, homers require a portable hone/meat saw to perform animal butchering in the field. Since the saw is often carried by the individual, it needs to be small, light weight, and compact. One of the most popular crosscut saw types is the 'bow saw' or 'Swede saw'. The modern bow saw consists of a slender saw blade connected and tensioned to a metal frame in the shape of an archer's bow. The bow saw's ergonomic design makes it possibly the best hand-held tool for crosscutting wood branches or boughs. Nevertheless, traditional bow saws have a rigid metal frame and, as a result, are not very compact and are difficult to pack and carry by an outdoor enthusiast. Various foldable saws have been proposed, see, for example, U.S. Pat. Nos. 8,266,806, 5,440,816, 3,191, 648, 4,580,344, 5,208,986, 4,499,936, 2,930,420, 3,245,445, and several foldable saws are commercially available. However, each of these saws has short comings in meeting the desirable objectives of a compact, packable saw: easy and quick set up and take down, light weight, and providing the sawing performance of a traditional bow saw.

SUMMARY OF THE INVENTION

According to the invention, a foldable bow saw is provided in a form that can be easily set up to an open, functional saw condition, to provide optimal sawing performance or taken down to a closed, packable condition, for optimal packability. For outdoor applications the ease and speed with which a foldable saw can be set up to a functioning saw and taken down to a compact form are very important features of the saw. The foldable bow saws of the invention includes a handle arm, a top bar, a short arm, a saw blade, and a lever arm all pivotally connected on to the other as a one piece assembly with an end of the handle arm and an end of the lever arm forming free, unconnected ends of the assembly. This assembly can be easily folded back upon itself during take down to form a compact folded or closed assembly for packing and storage, or the free ends of the assembly can be easily connected together during set up to form the open functional saw. Since the invention is a one-piece assembly, there are no loose separate parts that may be lost in set up or take down, particularly when set up or take down is performed under difficult environmental conditions. The handle arm has a free end forming an end of the assembly and an opposite end pivotally connected to an end of the top bar. The short arm has an end pivotally connected to the opposite end of the top bar, with an end of the saw blade pivotally connected to the opposite end of the short arm. The lever arm is pivotally connected to the opposite end of the saw blade, and has a free opposite end which forms the free opposite end of the assembly. The free end of the handle arm includes a connecting fulcrum surface adapted to removably mate with a fulcrum surface receiver in the lever arm when the free ends of the assembly are connected together during set up to form the functional saw. With the construction indicated, the saw of the invention can be set up from a collapsed or closed position in a few seconds with a properly set blade tension for immediate saw use. Further, upon set up (or take down), the user may grasp the lever arm that can shroud the saw blade teeth until the lever arm is ready to be connected to the end of the handle arm and then pivoted to connect and tension the blade. In this as the user does not need to touch the saw blade at any time during the set up or take down. Touching the saw blade can cause cuts and, with the lever arm, there is no need for the user to remove his or her gloves in cold weather to assemble the saw or to take down the saw. To ensure easy, repeatable setups, the saw of the invention has designed in 'centering grooves' in each of the two pins that held the blade in place. Also, the short arm and handle arm have blade slots with chamfered entrances to guide the blade into the blade slots. In addition, the bottom corners of the handle arm have 'guide' surfaces to ensure fool-proof alignment attic lever arm's fulcrum surface receiver (or notch) to the fulcrum surface at the bottom of the handle arm and thereby permit smooth pivot lever action and reproducible blade tension.

Commercially available foldable saws known to the inventors come in two frame-shape design: 1) acute triangle shape, e.g., Sven Saw, or 2) inverted U-shape, e.g., Dustrude Buck Saw. The inverted U-shaped frame allows the user to cut through considerably larger diameter tree branches and boughs than does the acute triangle-shaped frame. Also the 'non-handle arm' of the U-shaped frame may allow another person to grip the saw and thus make it into as two-person saw. However, the acute triangle-shaped frame generally allows the user to cut tree limbs in more physically constrained spaces than does a U-shaped frame.

The saw of the invention has a trapezium-shaped frame with the handle arm forming one side of the frame shape, the top bar forming the connecting web of the frame shape, and the short arm forming the opposite side of the frame shape. The short arm is considerably shorter than the handle arm, thus forming a trapezium frame shape when the saw blade is connected and it resembles the trapezium shape of many rigid-framed bow saws. This frame shape offers the performance advantages of both the U-shaped and the acute triangle-shaped frames.

By adopting a saw blade tensioning mechanism that uses a fulcrum surface and a lever arm, the bow saw of the mention can easily provide a blade tension (force) that optimizes saw performance and can ensure that this blade tension is repeatably achieved theta automatic pivot lever action.

The top bar is a long, slender, high-strength aluminum channel with the respective arms pivotally secured to opposite ends of the top bar. When assembled, the short arm and the handle arm form oblique angles at the hinge or pivot points at the ends of the top bar such that the bulk of the bending moment created by the pivot tensioning of the saw blade is transferred to the top bar. The top bar has been designed so that a distinct camber is noticeable when the saw blade is under proper tension. The bending moment in the top bar is of sufficient force such that the tension in the blade remains effective for cutting performance despite slight changes in blade length due to increased temperature or slight deformation of components due to long-term wear.

Saw blade tension is one of the most important parameters that define a saw blade's cutting performance. It also has an impact on how long teeth remain sharp. In general, the higher the tensioning force on the blade the better the blade's cutting performance and the longer the blade teeth remain sharp. Nevertheless, there are limits as to the practical tensile force (in pounds or newtons) that can be applied to a saw blade contained in a foldable bow. In particular, the areas where the end edge of the short arm kind the end edge of the handle arm bear against the bottom or web of the top bar are areas of high stress and limit the tensile force in the blade. This area of high stress can be a problem if the channel forming the top bar has a contoured outside web or bottom surface, such as if the outside of the joining edges between the bottom and sides along the channel are radiused. In such instance, the radiused edges reduce the flat surface of the web or bottom of the top bar between the radiused edges. This reduces the area of the bottom of the top bar contacted or abutted by a straight end edge of an arm. This increases the stress on this smaller area of contact. If the top bar is contoured, such as if the edges acre radiused, the end edge of the short arm and the end edge of the handle arm that abut the bottom portion of the top bar can be contoured oppositely to the bottom portion of the top bar such that they mate and bear upon the entire bottom portion of the top bar. This increases the area of contact between the ends of the arms and the bottom of the top bar to distribute the force along this increased area of contact. In this way the bearing surface area on the top bar is maximized at both the end of the short arm and the end of the handle arm. The contoured arm end edge when compared to a straight end edge not only increases the bearing surface area—thus lowering the stress for a given force—but it also distributes much of the load force to the radius surface areas below the outer flanges of the top bar. The top bar's outer flanges are able to withstand much greater stresses than the top bar's web area. This contouring of the end edges of the short arm and handle arm permits higher blade tensions without tension loss due to metal fatigue in the top bar or end edges when using a contoured top bar.

The length of as bow saw's blade is a major determinant of its sawing performance. Generally speaking, the longer the blade, the better the sawing performance especially with respect to human fatigue over long periods of sawing. As well, for a given blade length, the frame shape of the bow saw can reduce the effective length of the saw blade. The 'effective' length of a blade refers to the length of saw travel before an obstruction is encountered. An acute triangle frame significantly reduces the effective blade length for larger diameter boughs and logs (say greater than three inch diameter for a twenty one inch saw blade). The foldable saw of the invention is designed based on a twenty one inch saw blade. This blade length offers a nice balance between good sawing performance and good packability, but the saw can be built for various other blade lengths. From a packability perspective, the ratio of the overall length of the folded or closed foldable saw to the saw blade length should be as close to 1.00 as possible. The design of the invention can provide a ratio as low as 1.036 (i.e., saw length (tip-to-tip) of 21.625"/blade length (tip-to-tip) of 20.875"). This is the lowest ratio of any one piece, U-shaped fame foldable saw known to the inventors. This low ratio is achieved through the sizing of the short arm of the frame to be of sufficient length such that when it is pivoted in-line with the top bar, the total length of the short arm plus the top bar (when the blade is nested in the channels) equals the length of the blade. The handle arm is then free to just swing over the top bar channel to hold the blade of place. No other foldable saw design, either acute triangle shape or U-shape, makes use of a short arm to extend the length of a top bar to just hold a saw blade length.

The unique design of the saw of the invention affords the additional function of allowing the handle arm's length to be such that the angle between the saw blade and the handle arm is optimized for the greatest sawing comfort for the user. Further, the saw's overall weight and closed profile are comparable or better than call other commercially available twenty one inch pack saws.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT

Figure 1:
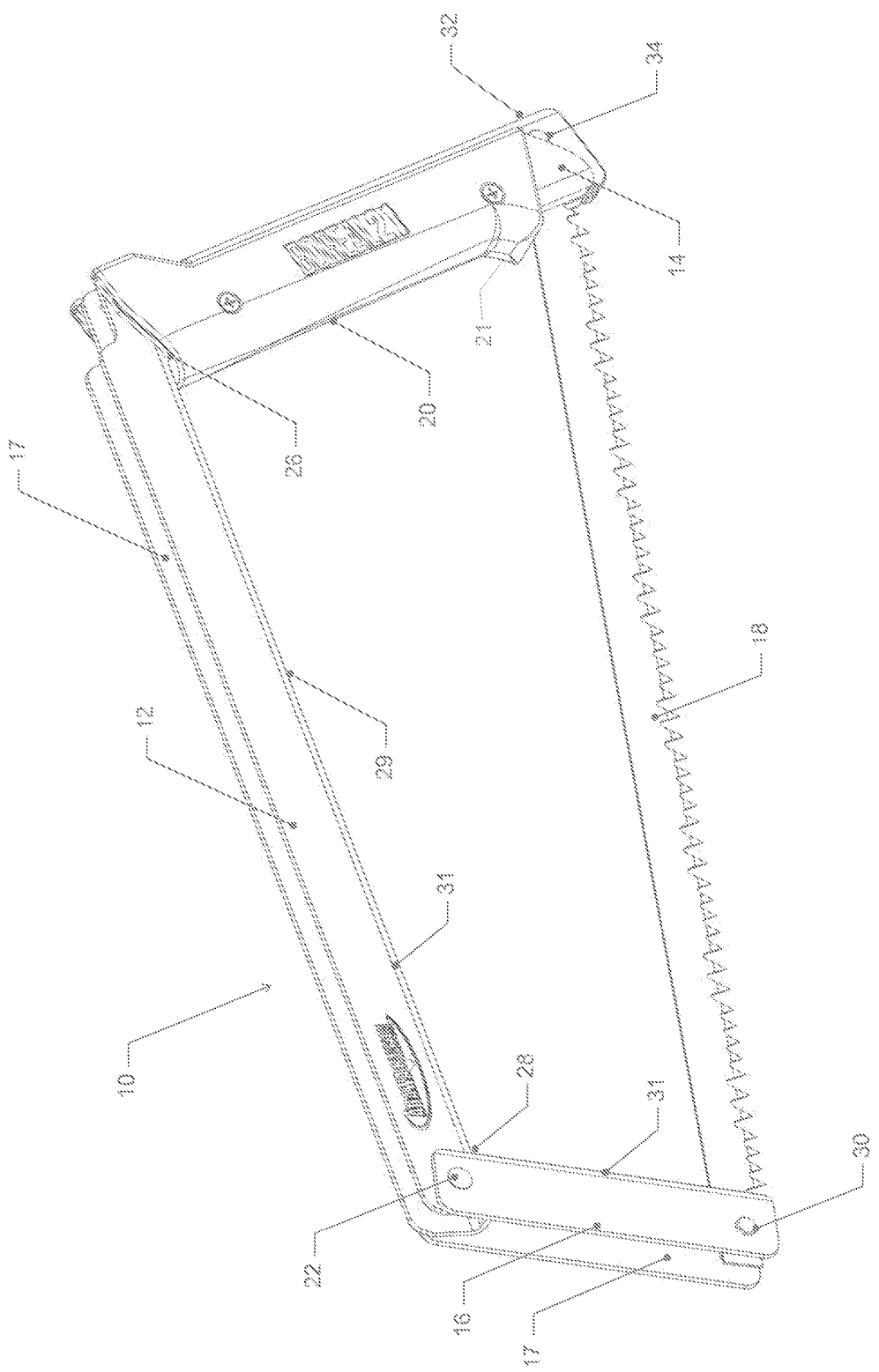
FIG. 1 is a pictorial view of the set up saw of the invention in open functional saw condition.
Figure 2:
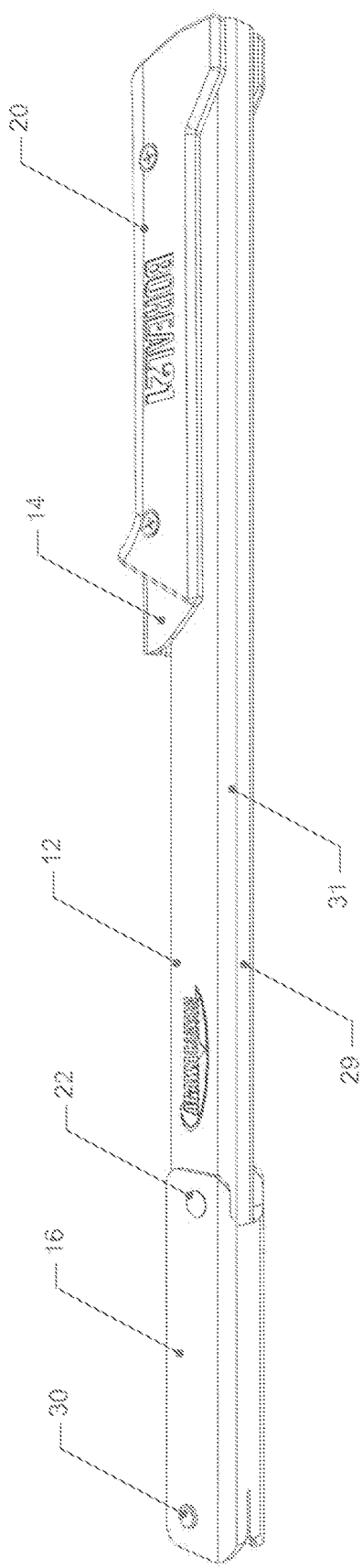
FIG. 2 is a pictorial view of the taken down saw of the invention in closed packing condition.
Figure 3:
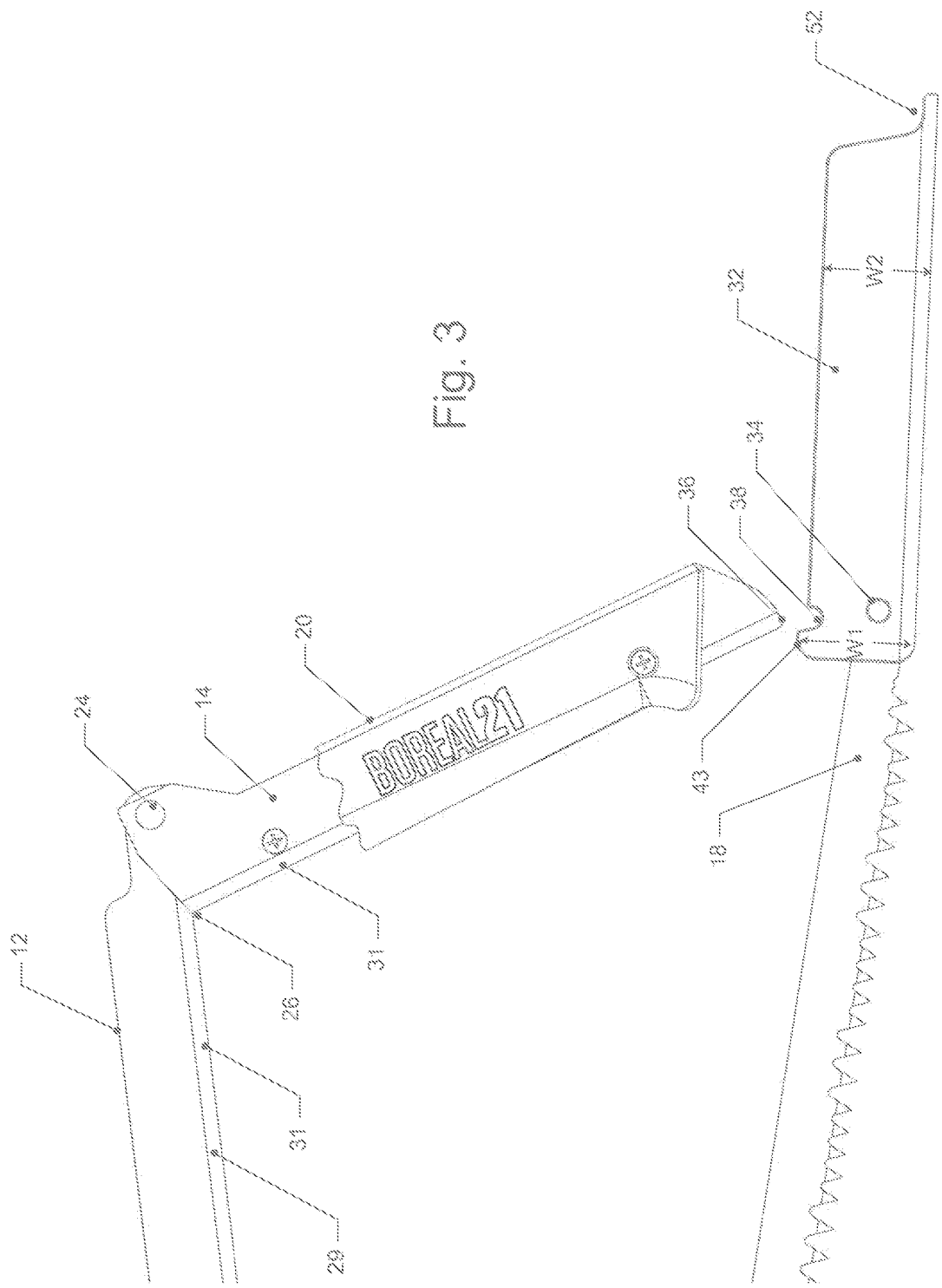
FIG. 3 is a fragmentary side view of the handle side of the saw with the handle arm of the saw of the invention showing its connection at one end to the top bar and showing the lever arm and saw blade in position to be attached to the opposite end of the handle arm.
Figure 4:
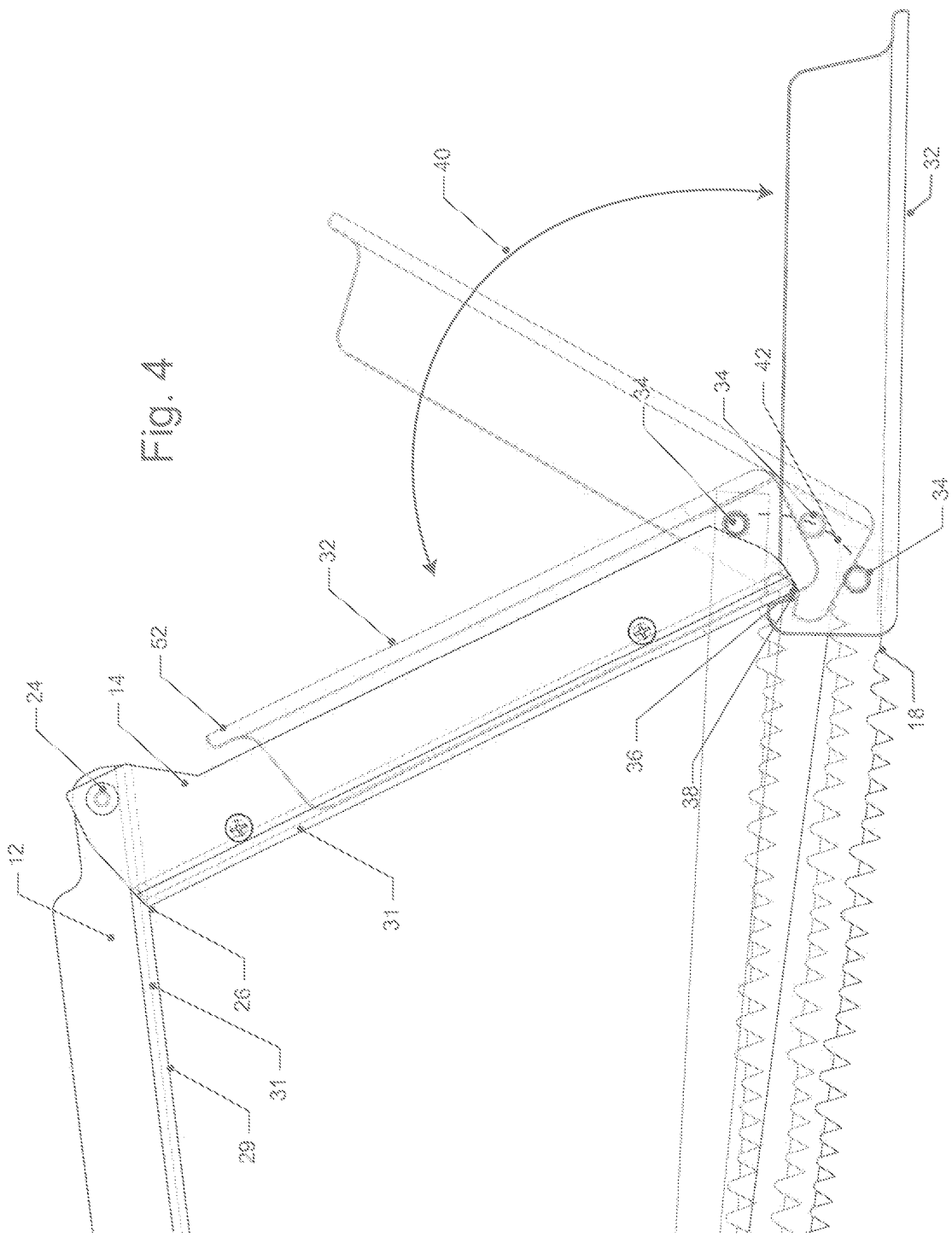
FIG. 4 is a fragmentary side view of the handle side of the saw similar to that of FIG. 3 showing the handle arm with the lever area and saw blade in the position shown in FIG. 3 and with the lever arm rotated to attached position shown in broken lines.
Figure 8:
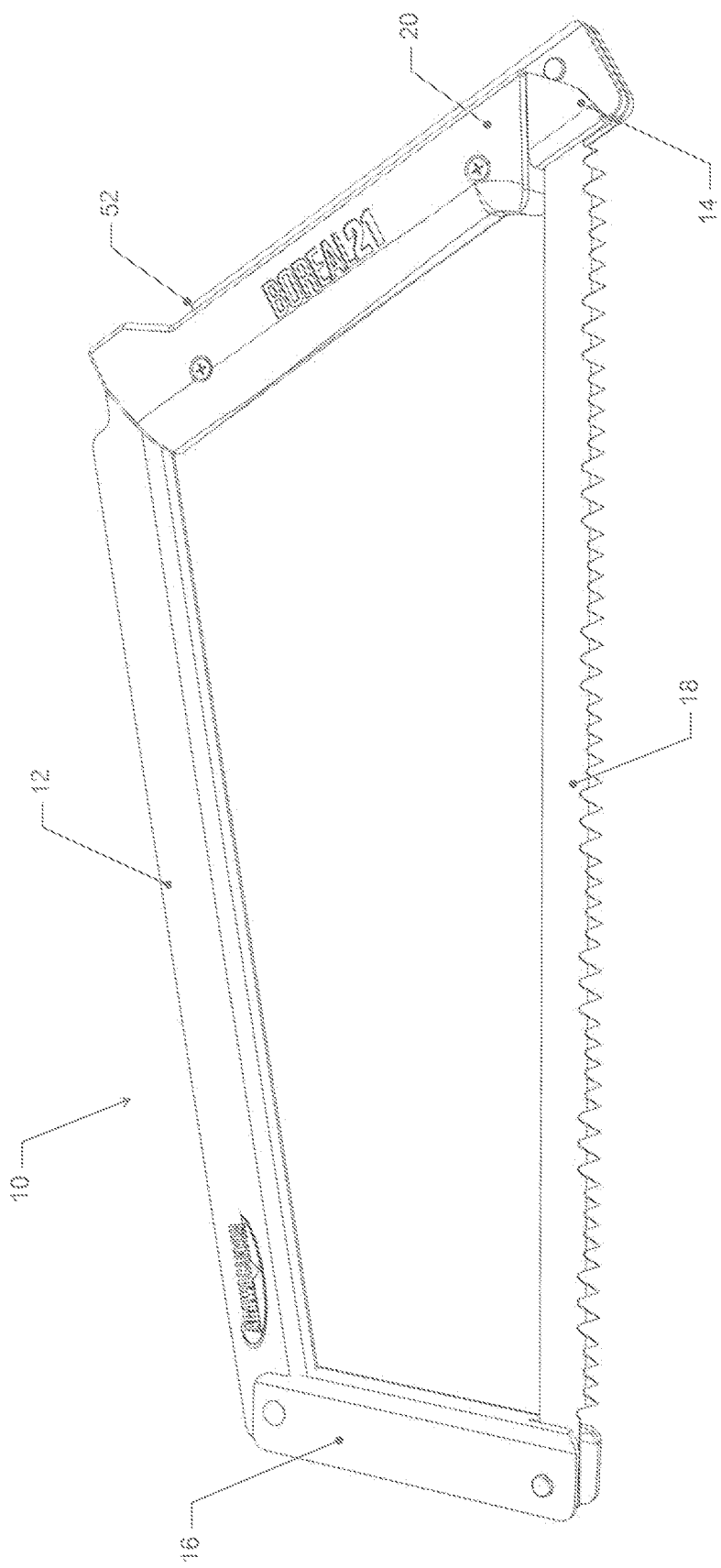
FIGS. 8-23 are various views showing the saw being taken down from open functional saw condition, shown in FIGS. 8-10, sequentially to closed packing condition shown in FIG. 2.
Figure 12:
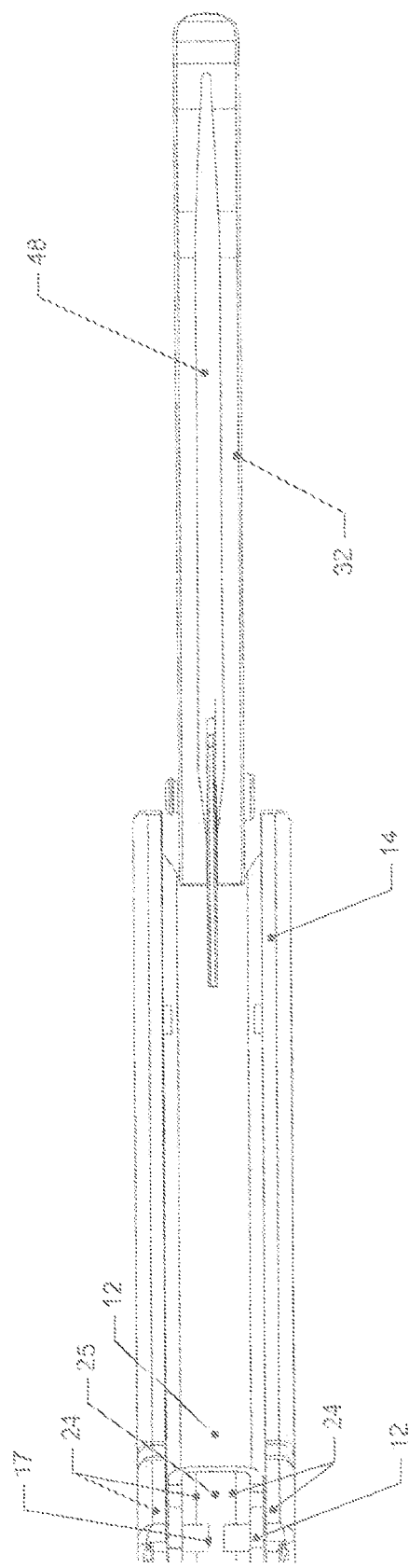

The present invention provides a foldable bow saw that can be easily set up to an open, functional saw condition, FIGS. 1 and 8, to provide optimal sawing performance or taken down to a closed, packable condition, FIG. 2, for optimal packability. As shown in FIGS. 1 and 8, in set up open functional saw condition, the foldable saw, indicated generally by 10, provides an effective trapezium-shaped frame formed by top bar 12 with handle arm 14 extending from one end thereof and short arm 16 extending from the opposite end thereof. A saw blade 18 extends between the opposite ends of handle arm 14 and short arm 16. A handle grip cover 20 is secured around handle arm 14 to provide at comfortable grip surface for a user when using the saw. The handle grip cover 20 can include a handle grip end flange 21 to keep a user's hand from sliding down the handle and the user's little finger from contacting the saw blade during use of the saw. Short arm 16 is pivotally connected to one end of top bar 12 by a pivot pin 22 extending through the end of short arm 16 and the end of top bar 12. Similarly, as shown by FIGS. 3 and 4, the end of handle arm 14 is pivotally connected to the opposite end of top bar 12 by pivot pin 24. Pivot pin 24 is not visible in FIG. 1 because it is covered by handle grip cover 20, which is broken away in FIG. 3 and in FIG. 4, is completely removed so is not shown. Top bar 12, handle arm 14, and short arm 16 are shown as lengths of metal channel material with the open channels 17 opening away from the saw and with the channel webs facing into the saw. High-strength aluminum channel, such as extruded 6063-T5 aluminum channel, has been found satisfactory. While reference is made to a pivot pin extending through an end of an arm and the end of top has 12, such as to pivot pin 22 extending through the end of short arm 16 and the end of top bar 12, and to pivot pin 24 extending through the end of handle arm 14 and the opposite end of top bar 12, such reference includes any type of pivotal connections, such as separate pivot connections on each side of top bar 12 and short arm 16, and on each side of top bar 12 and handle arm 14, such as shown in FIG. 12 for pivot pin 24, leaving a space or opening 25 between the separate pivot connections through the channel sides of top bar 12 so as to not obstruct the open channel 17 in top bar 12 with as pivot pin extending completely through the channel. Channel 17 needs to remain open to receive saw blade 18 when the foldable bow saw is in closed, packable condition.

When handle arm 14 and short arm 16 are rotated to the positions shown in FIG. 1, handle arm 14 and short arm 16 have web end edges 26 and 28, respectively, which abut the outer surface 29 of the inward facing web of lop bar 12 to prevent further rotation of the handle arm 14 and short arm 16 inwardly toward one another. When in assembled condition as shown in FIG. 1 with saw blade 18 under proper tension, top bar 12 will exhibit a noticeable camber. The camber in the top bar is greater than in the handle arm and short arm because the top bar is longer than either the handle arm or short arm, two to four times longer in the illustrated embodiment, so the betiding moment of the top arm is two to tour times greater than that of the handle arm or short arm. The bending moment in the top bar 12 is of sufficient force such that the tension in the blade remains effective for cutting performance despite slight changes in blade length due to increased temperature, or slight deformation of components due to long-term wear.

Figure 1B:
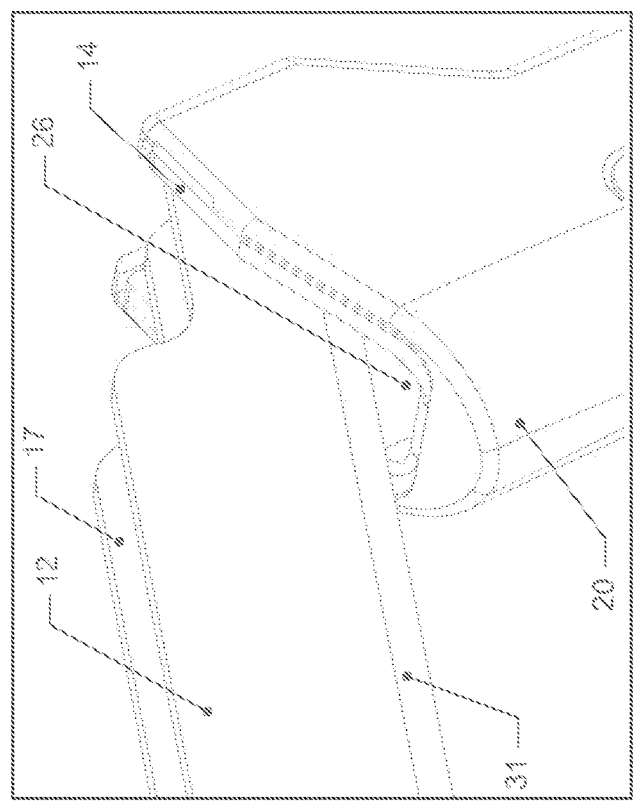
FIG. 1*b* is an enlarged fragmentary view of the connection between the right end of the top bar and the handle arm as shown in FIG. 1 but before the handle arm is rotated sufficiently to abut the bottom of the top bar
Figure 1A:
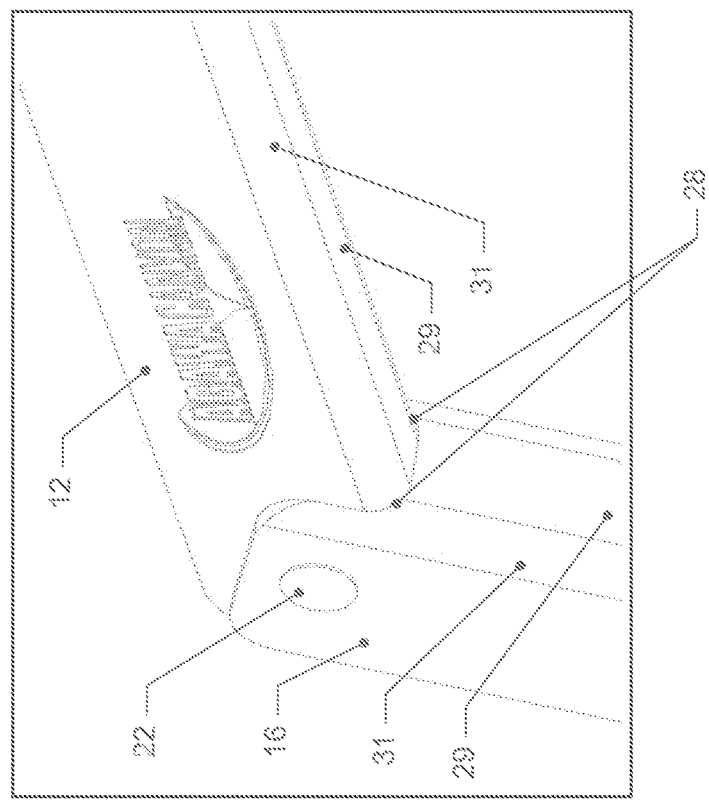
FIG. 1*a* is an enlarged fragmentary view of the connection between the left end of the top bar and the short arm as shown in FIG. 1, but from a different angle.
Figure 7:
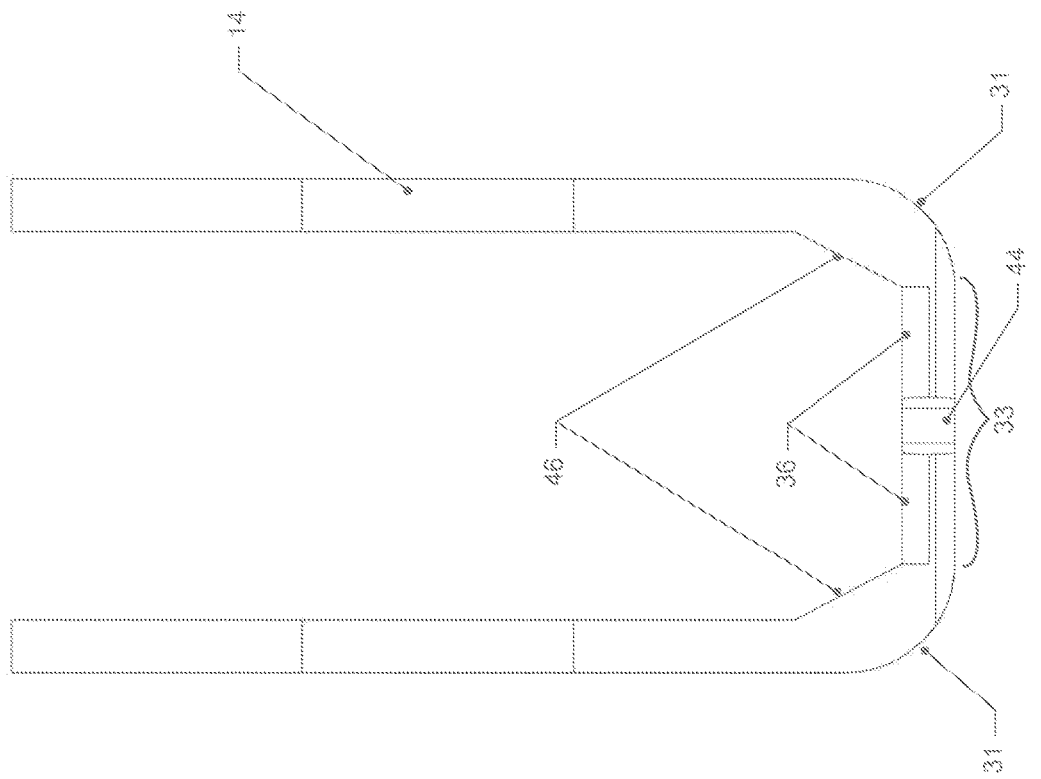
FIG. 7 is an end view of the channel forming the handle arm.

While the channels forming the top bar 12, the handle arm 14, and the short at 16 can have flat sides and a flat web with ninety degree corners forming the edges between the web and sides along the length of the channel thereby forming an outer web surface 29 that is flat as it extends between the side edges, the example embodiment of the invention illustrated includes a contoured outer web surface formed by radiused corner edges 31 along the length of the channels forming the top bar, handle arm, and short arm as shown in FIGS. 1-4 and particularly in FIG. 7 showing the channel forming the handle arm, which has the same configuration as the channels forming the short arm and the top bar. The channels having the radiused edges provide smooth corners which are more comfortable for a user to hold and are more aesthetic. However, the rounded radiused corners 31, as best seen in FIG. 7 reduce the width of the flat portion 33 of the outer surface 29 of the web. If the arm web end edges 26 and 28 are straight, when the saw is in the open, functional saw condition with the arm web end edges 26 and 28 abutting the Outer surface 29 of the inward facing web of top bar 12, the arm web end edges 26 and 28 will abut only the flat portion 33 of the web outer surface 29. All of the force and stress between the arm web end edges 26 and 28 and the top bar outer web surface which prevent further rotation of the handle arm 14 and short arm 16 inwardly toward one another while holding the saw blade under substantial tension is concentrated on this small flat portion 33 of the web outer surface 29 and the small abutting portions of the arm web end edges. Depending upon the strength of the top arm web and the arm web end edges, this can limit the force that can be applied between the top bar web and the arm web end edges which can limit the tension that can be applied to the saw blade. It has been found that when a contoured web surface 29 is used in the top bar of the saw of the invention, the amount of stress that can be applied between the arms and the top bar for the same arms and top bar can be increased if the area web end edges 26 and 28 are contoured oppositely to the web surface 29 of the top bar such that they bear upon the entire web surface 29 of the top bar, as opposed to bearing only on the flat portion 33 of the web surface 29. This opposite contour of the arm web end edge 28 of short arm 16 is shown in FIG. 1*a* wherein the arm web end edge 78 closely fits against the entire web surface 29 of top bar 12, including the flat portion 33 and the radiused edges 31. This opposite contour of the arm web end edge 26 of handle arm 14 is shown in FIG. 1*b* wherein the arm web end edge 26 is not quit abutting the web surface of top bar 12, but the opposite contour of the arm web end edge 26 to the web surface of top bar 12 which includes the straight portion and radiused portions is shown and a can be seen that the two surfaces will mate along the entire surfaces as the handle arm 14 is further rotated into abutting relationship with the web surface of the top bar. Having the oppositely contoured arm web edge which mates with the contoured web surface increases the area of contact between the ends of the arms and the web of the top bar to distribute the force applied along this increased area of contact. In this way the bearing surface area on the top bar is maximized at both the end of the short arm and the end of the handle arm. The contoured arm end edge when compared to a straight end edge not only increases the bearing surface area—thus lowering the stress for a given force—but it also distributes much of the load force to the radius surface areas below the sides of the top bar. The top bar's sides are able to withstand much greater stresses than the top bar's flat area between the sides. This contouring of the end edges of the short arm and handle area permits higher blade tensions without tension loss due to metal fatigue in the top bar or end edges when using a contoured top bar.

Figure 10:
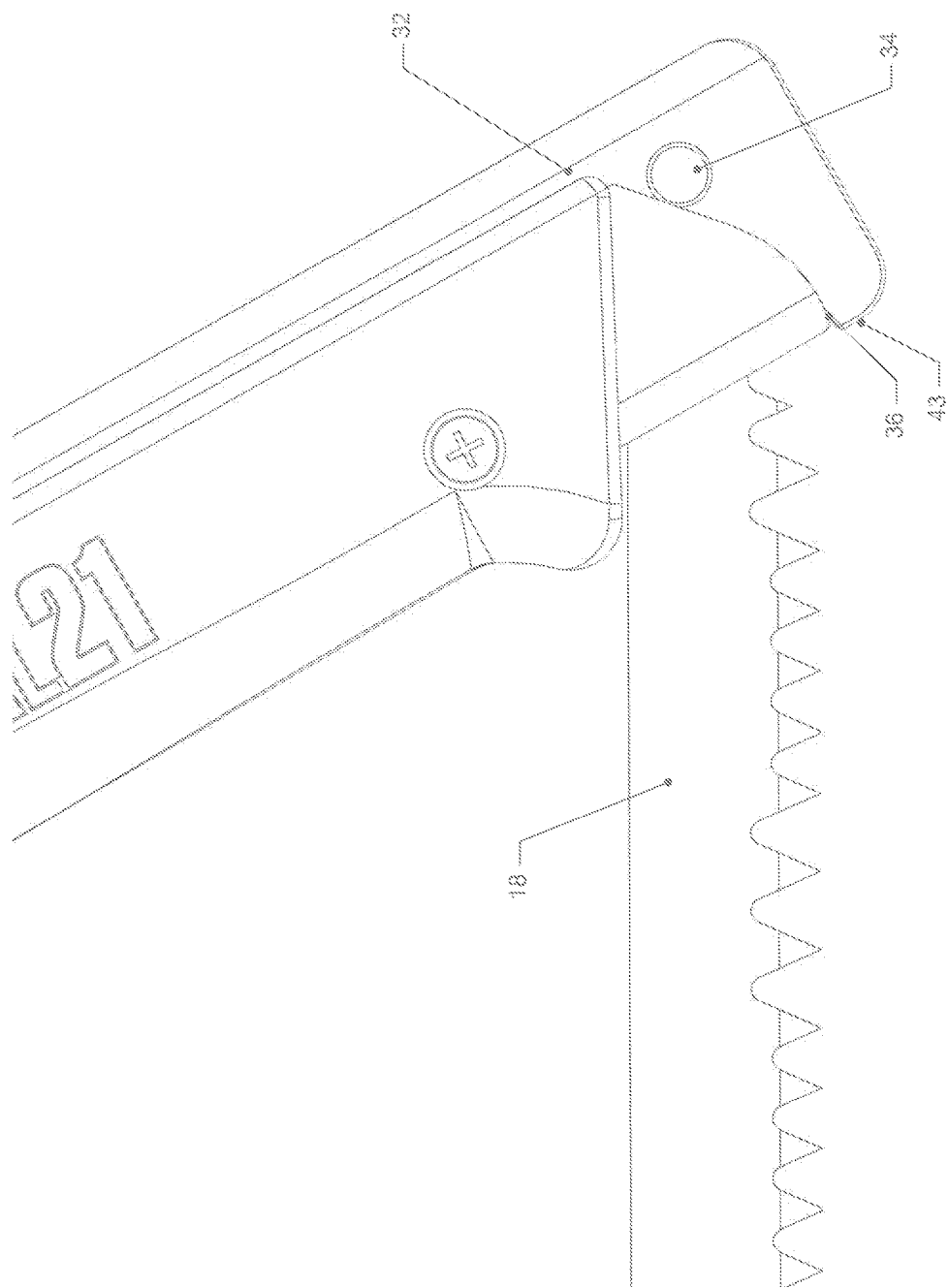
Figure 11:
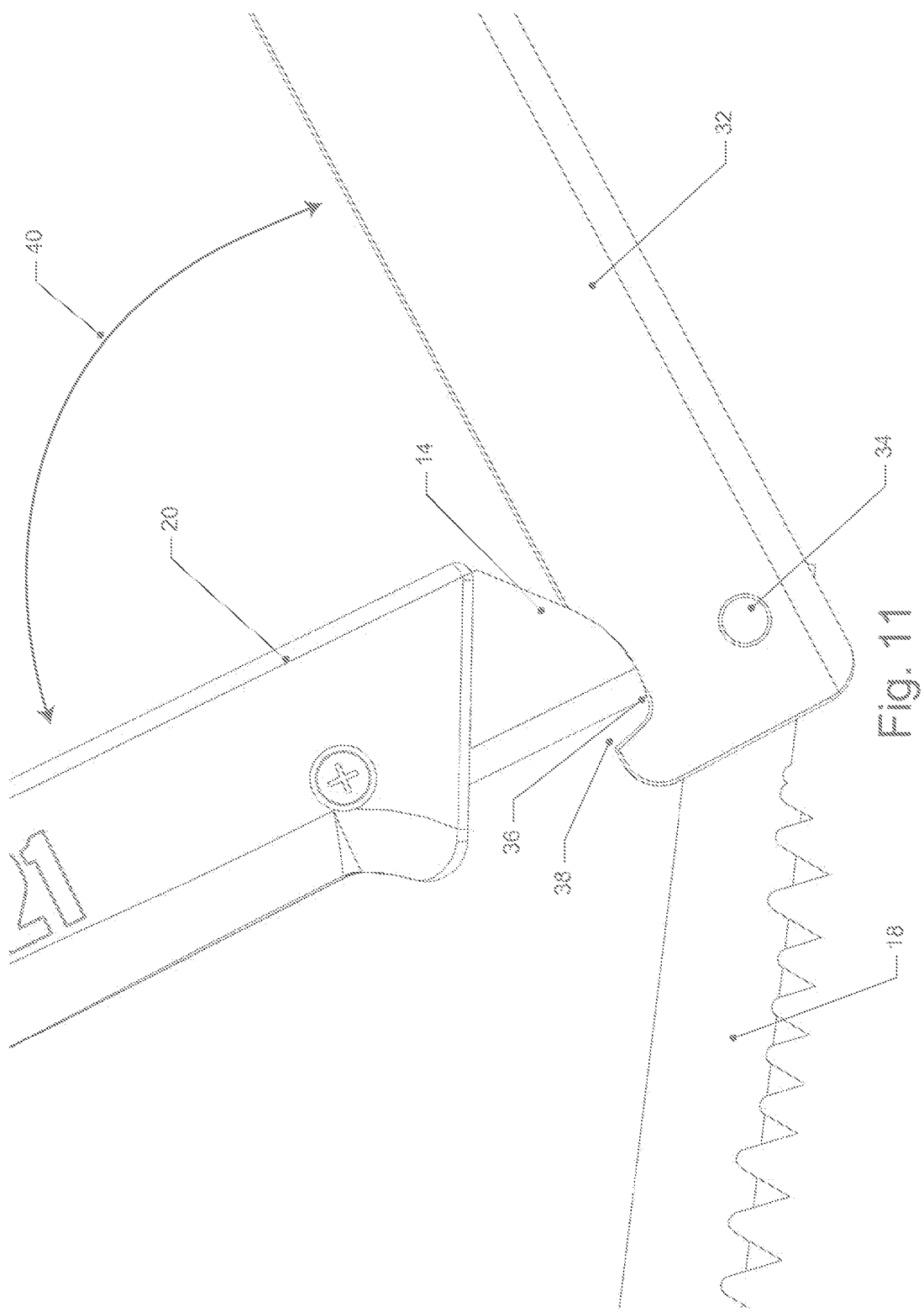
Figure 13:
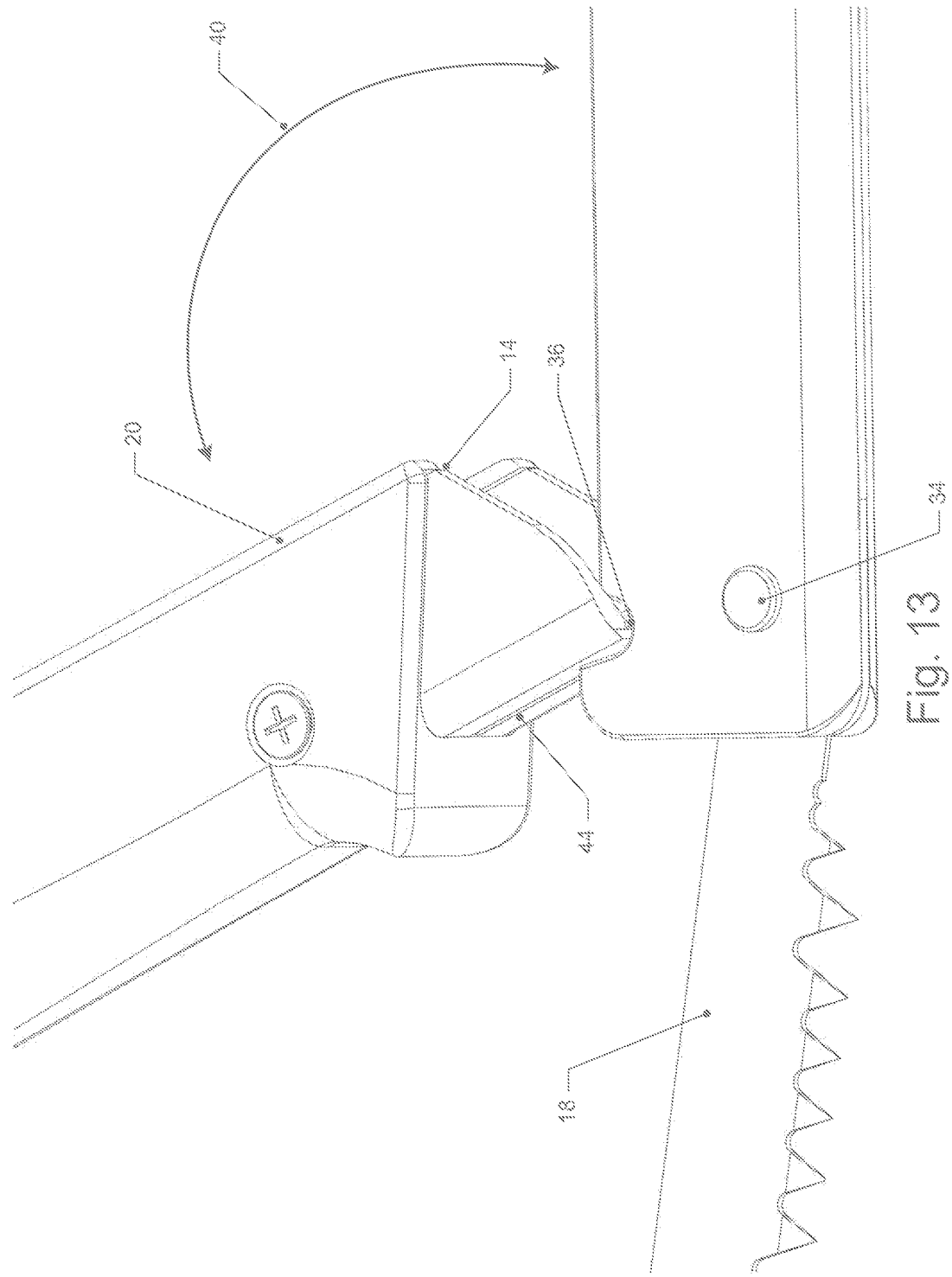

As shown in FIG. 1, an end of saw blade 18 is pivotally attached to an end of short arm 16 by pivot pin 30. The opposite end of saw blade 18 is pivotally attached to lever arm 32 by pivot pin 34. As shown in FIG. 3, the web edge at the free end of handle arm 14 forms a fulcrum surface 36 for receipt by a fulcrum surface receiver 38 shown in the form of a notch in lever arm 32. During set up of the saw, lever arm 32 is positioned with respect to the free end of handle arm 14 so that fulcrum surface 36 extends into fulcrum surface receiver 38 as shown in FIGS. 3, 4, and 13. Lever arm 32 is then rotated counterclockwise (locking direction) against fulcrum surface 36, FIGS. 4 and 11 is indicated by arrow 40 to the position shown in FIG. 4 in broken lines where pivot pin 34 holding the end of saw blade 18 has been moved along arc 42, FIG. 4, to tension blade 18 and move pivot pin 34 over center so that lever arm 32 is securely positioned and held in that position against handle arm 14, as shown in broken lines in FIG. 4 and as also shown in FIG. 10. This over center movement is shown by arc 42. FIG. 4, starting with the pivot pin 34 at the lower end of arc 42 representing the untensioned condition of the saw blade 18 where the fulcrum surface 36 is received in Internal surface receiver 38. In this condition, the fulcrum surface 36 can be easily moved into and out of fulcrum surface receiver 38 and lever arm 32 can be easily separated from handle arm 14, as shown in FIG. 3. From this untensioned condition shown in FIG. 4, lever arm 32 is rotated in locking direction shown by arrow 40 and progressively more tension is applied to saw blade 18 as pivot pin 34 moves along arc 42 until pivot pin 34 is even with fulcrum surface 36 as shown by the intermediate position of pivot pin 34 along arc 42 in FIG. 4. This represents the highest tension on cask blade 18. As rotation of lever arm 32 continues in the locking direction beyond this position, the tension on saw blade 18 decreases until lever arm 32 rests against handle arm 14. Since handle arm 14 is of channel shape, lever arm 32 will rotate into the channel and rest against the channel web of handle arm 14 as shown in broken lines in FIG. 4 (locked positioned). As evident from the positions of pivot pin 34 shown at the lower and upper ends of arc 42, saw blade 18 remains tensioned in the locked position. The tension provided by the saw frame to the saw blade is set by the position of the pivot pin with respect to the lever arm and the fulcrum surface receiver 38. This is a factory setting during manufacture of the lever arm 32.

Figure 9:
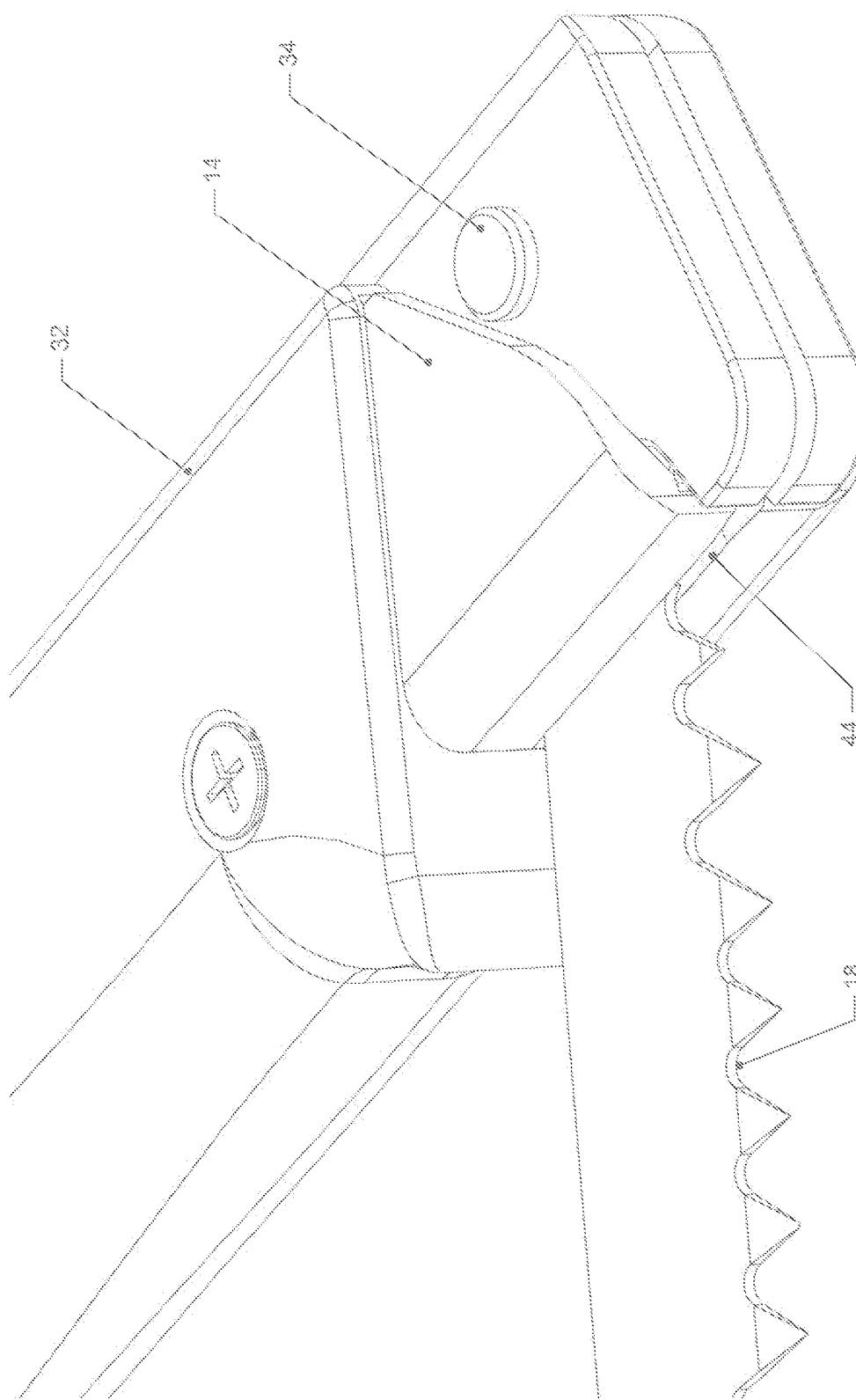

When the lever arm fulcrum surface receiver 38 (notch) rests on the handle arm fulcrum surface 36 and the lever arm 32 is slowly rotated in the locking direction 40 into the handle arm 14, at first the tension from the saw blade 18 cause all the force to act on the two fulcrum surfaces, FIGS. 13 and 11, but when the saw blade pivot pin 34 in the lever at 32 moves above the fulcrum surfaces, FIGS. 4 and 10, then very quickly the blade tension is transferred to along the 'bottom' surface of the lever arm and onto the bottom inner hearing surface of the web of the handle arm. With this force on the lever arm, the lever arm almost snaps closed. Once the lever arm is against the kindle arm (shown as in the channel of the lever arm), because of the slope of the handle arm in relation to the saw blade, there is a small positive force exerted upwards on the lever arm along the handle arm. However, the lever arm does not slowly move upwards because the end of the lever arm notch 43 slightly overhangs the handle area end surface, FIG. 10, i.e., the width W1, FIG. 3, of the end of the lever arm 32 is greater that the width W2 of the remainder of the lever arm 32. In addition, a saw blade receiving slot 44. FIGS. 7, 9, and 13, in the end of the web of handle arm 14 can also keep the saw blade and lever arm from moving upwardly with respect to the handle arm.

Figure 5:
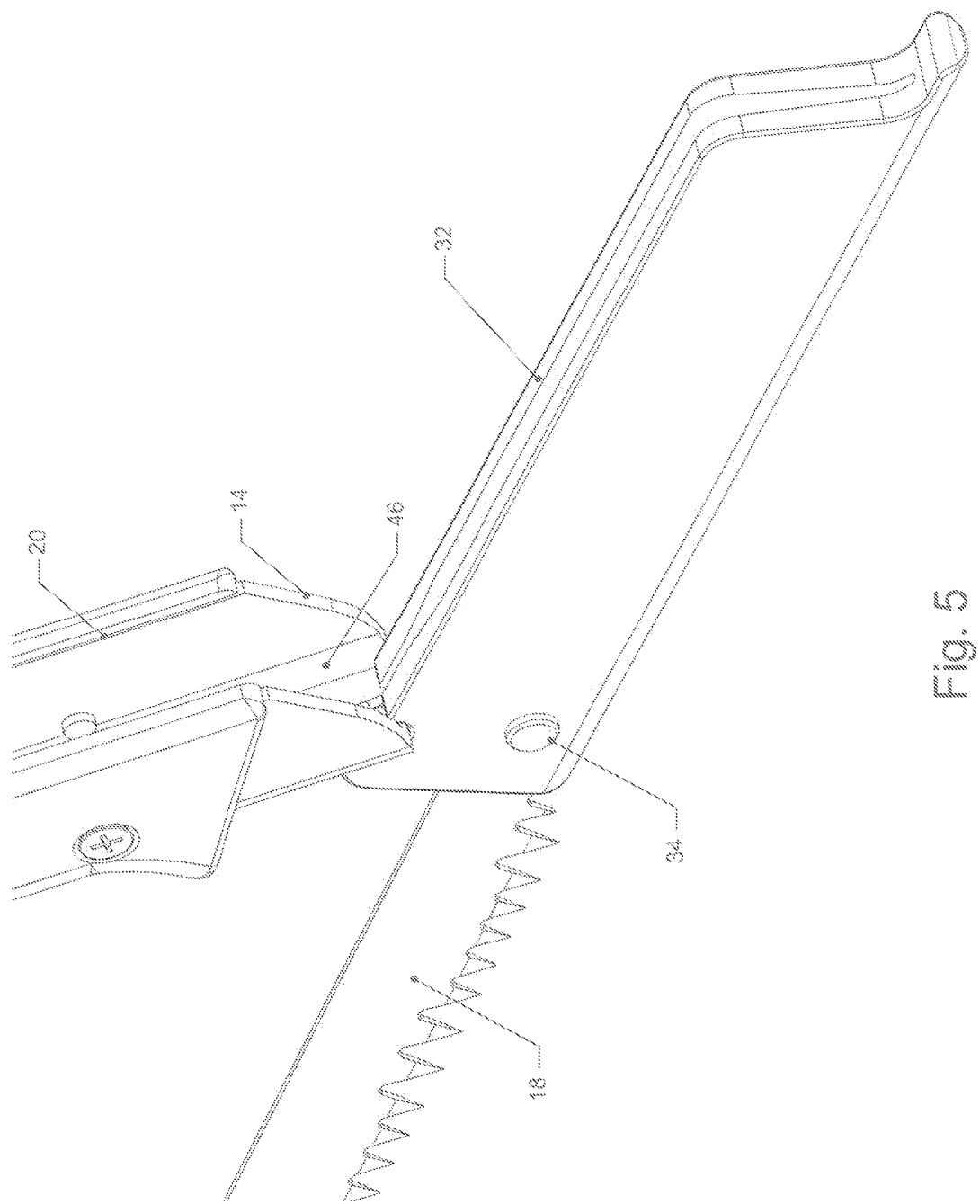
FIG. 5 is a fragmentary pictorial view of the end of the handle arm with the lever arm and saw blade ready for attachment.
Figure 6:
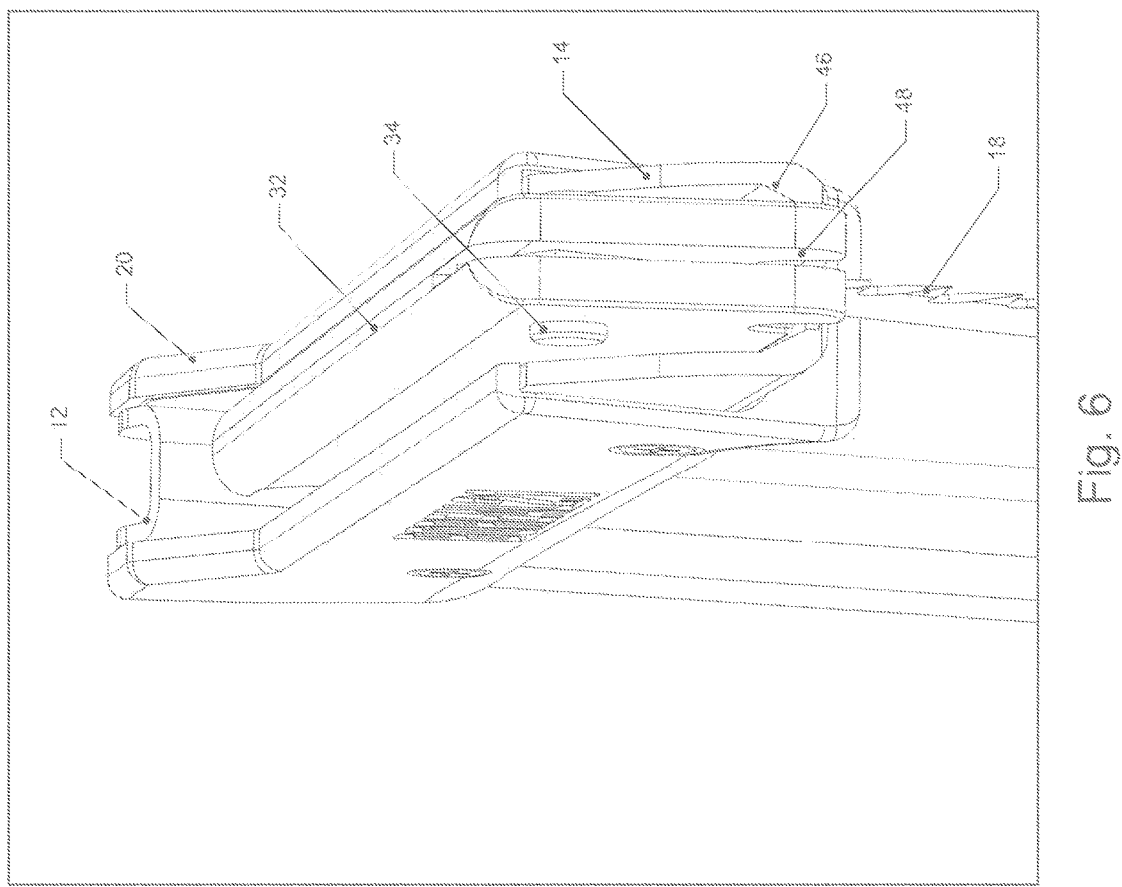
FIG. 6 is a pictorial view of the end of the handle arm with the lever arm and saw blade connected thereto.

For ease of insertion of the fulcrum surface 36 into the fulcrum surface receiver 38 in the lever arm 32 and alignment of the lever arm with the bottom of the handle arm during such insertion and during rotation of the lever arm, the end of the handle arm firming the fulcrum surface can include guiding tracks or guide rail surfaces 46 on the bottom corners of the handle arm as shown in FIGS. 5, 6, and 7. These guide rail surfaces 46 will center lever arm 32 during insertion of the fulcrum surface into the fulcrum surface receiver and during rotation of lever arm 32 with respect to handle arm 14. Further, as can be seen in FIG. 6, lever arm 32 includes a saw blade receiving slot 48 to keep saw blade 18 centered with respect to lever arm 32. Further, blade receiving slot 48 extends as a channel the entire length of the lever arm 32 opening away from the saw similarly to the channels in the handle arm, the top bar, and the short arm, but of narrower width. Pivot pin 34 pivotally connecting saw blade 18 to the lever area 32 can also include a centering groove, not shown, to hold sass blade 18 centered with respect to lever arm 32 and slot 48. Since lever arm 32 is not subject to bending moments as are the top bar the handle arm, and the short arm, lever arm 32 can be made of plastic rather than metal, although metal or other materials can be used.

Pivot pin 30 pivotally connecting saw blade 18 to short arm 16, FIG. 1, can also include a centering groove, not shown to hold saw blade 18 centered with respect to short arm 16. Similarly to saw blade receiving slot 44 in the end of handle arm 14, a saw blade receiving slot 50, FIG. 14, can be provided in the end of short arm 16 to receive and center the end of saw blade 18 pivotally attached to short arm 16. Each of the blade receiving slots 44 in handle arm 14 and 50 in short arm 6 have chamfered entrances to guide the saw blade into the slots.

Figure 14:
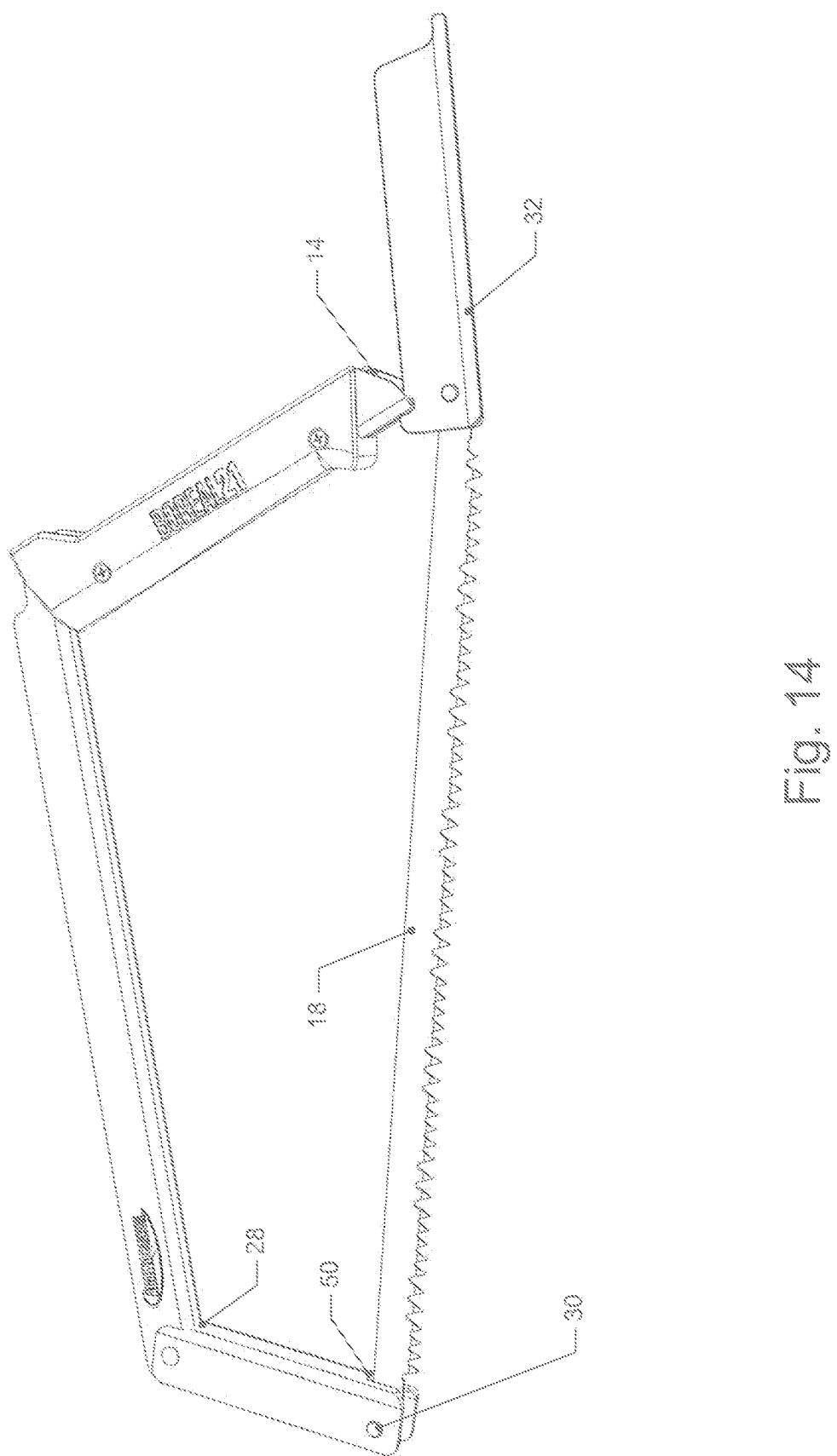

To take down the saw from the functional saw condition of FIG. 1 with the lever arm 32 in locked position as shown in FIGS. 1 and 4, lever arm 32 is rotated in as clockwise, unlocking direction back to the position shown in FIGS. 4 and 13, so that lever arm 32 and fulcrum surface receiver 38 can be roved away from the fulcrum surface 36 to release the attachment of the saw blade 18 and lever arm 32 to the end of the handle arm 14 as shown in FIGS. 3 and 14 and allow the assembly to be folded back upon itself into packable condition as shown in FIG. 2. A lever arm end extension 52, FIGS. 3, 4, and 8, provides a hold to grip the lever arm when in locked position and start rotation out of locked position. A user can insert a finger into the open channel of the handle arm 14 to hold and pull lever arm end extension 52 and lever arm 32 to release it from locked position and rotate it back to the untensioned position of FIGS. 3 and 4.

Figure 15:
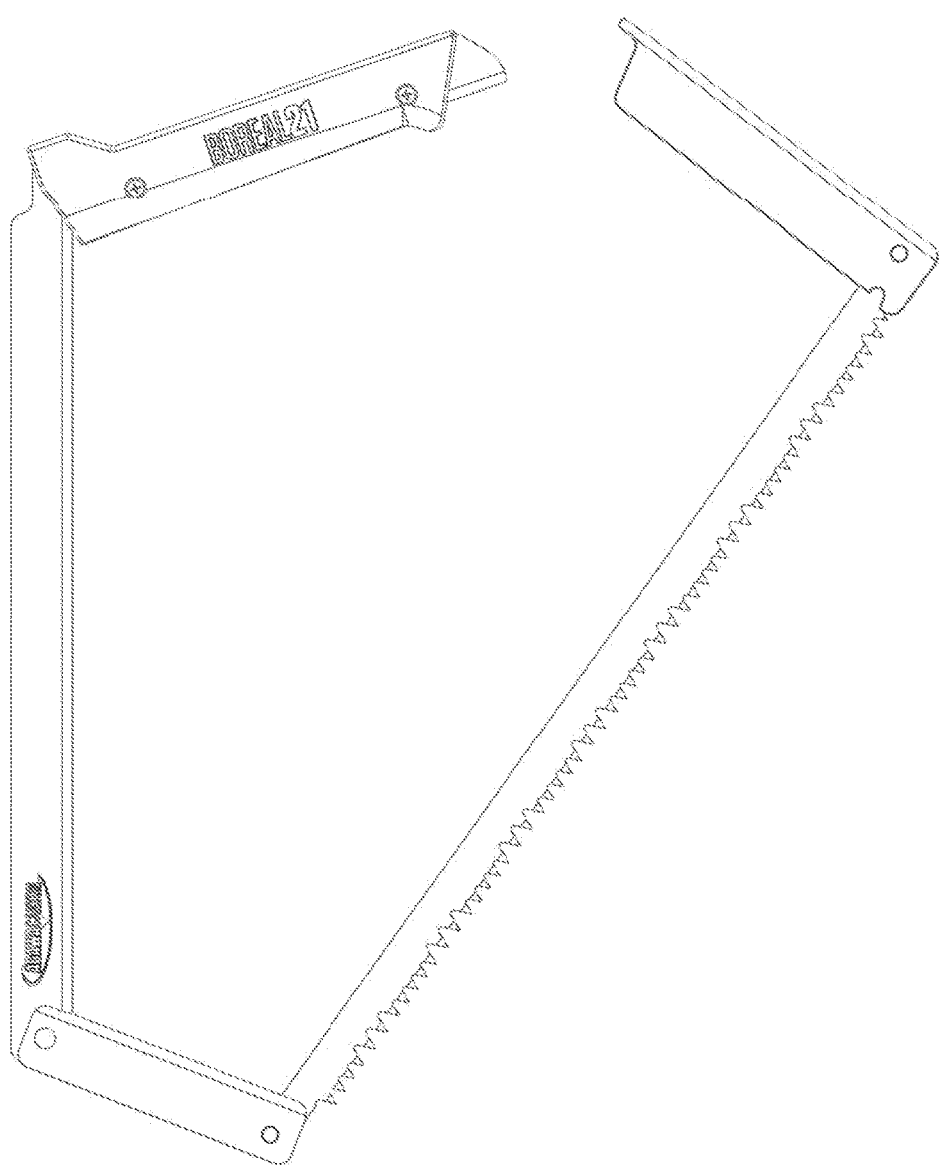
Figure 16:
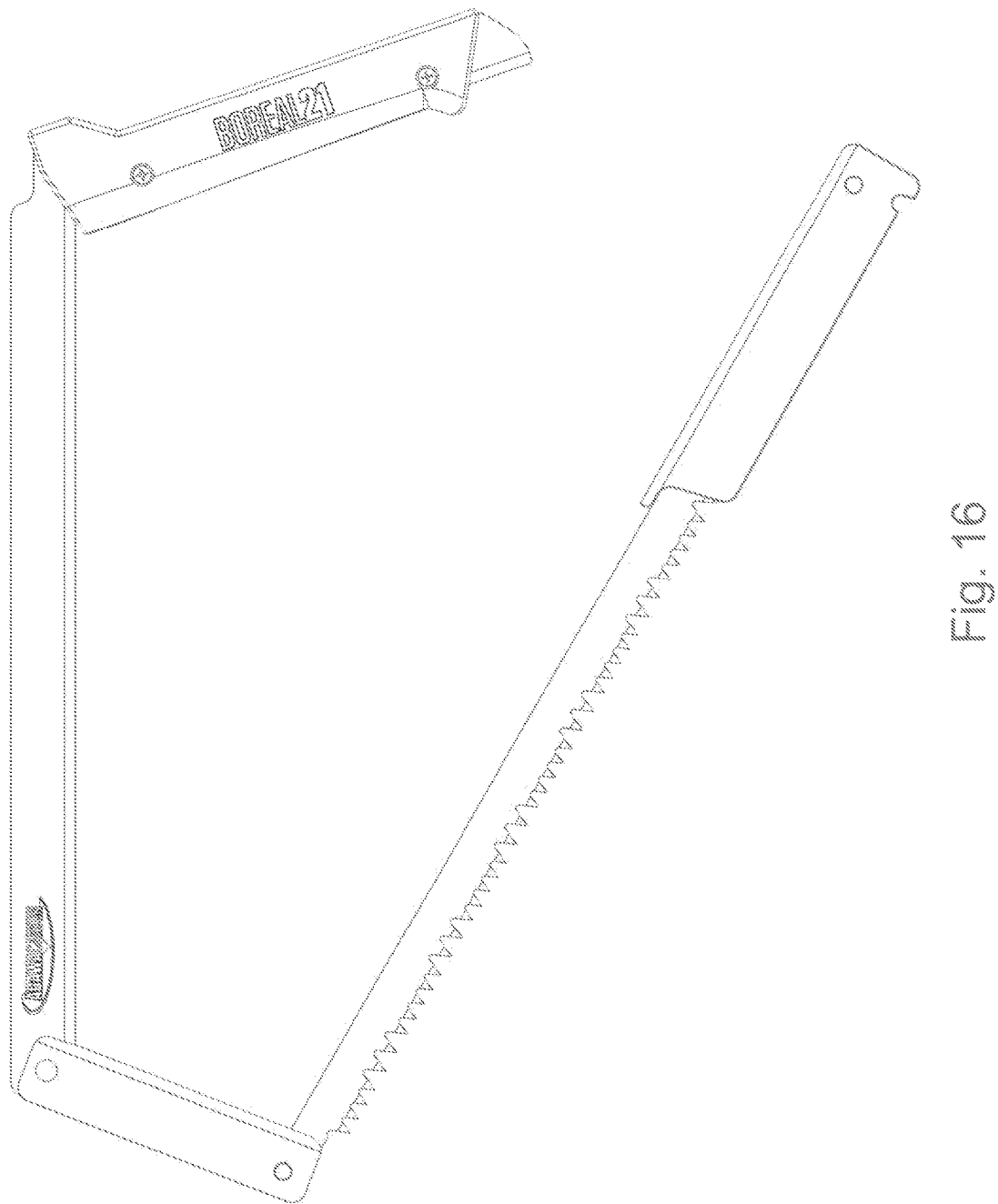

FIGS. 8-23 and 2 show the folding of the saw from the functional saw condition shown in FIGS. 8, 9, and 10, to the completely folded, packable condition shown in FIG. 2 FIGS. 11 and 12 show rotation of lever arm 32 from the locked position of FIGS. 8, 9, and 10, to the untensioned position shown in FIG. 13 and starting to be moved away from the handle arm 14 shown in FIG. 14. FIG. 15 shows the saw blade and lever arm moved away from the handle arm and the lever arm being rotated from the position in line with the saw blade as shown in FIG. 14, counter clockwise a quarter turn with continued rotation counter clockwise to the position shown in FIG. 16 wherein the end portion of the saw blade 18 is received in channel slot 48 along the length of the lever arm 32 so that the end portion of the saw blade and saw teeth are completely sheathed by the lever arm as shown in FIG. 16. During rotation of lever arm 32 from the locked position to the untensioned condition shown in FIG. 14, and during movement of the lever arm 32 away from handle arm 14 and rotation of the lever arm from being in line with saw blade 18 as shown in FIG. 14 to its position in FIG. 16 wherein it sheaths the end portion of saw blade 18, the user merely holds and manipulates the lever arm 32 and never needs to touch as blade 18. With lever arm 32 sheathing the end portion of saw blade 18 as shown in FIG. 16, the user can further manipulate saw blade 18 by merely holding lever arm 32 and not touching saw blade 18.

Figure 17:
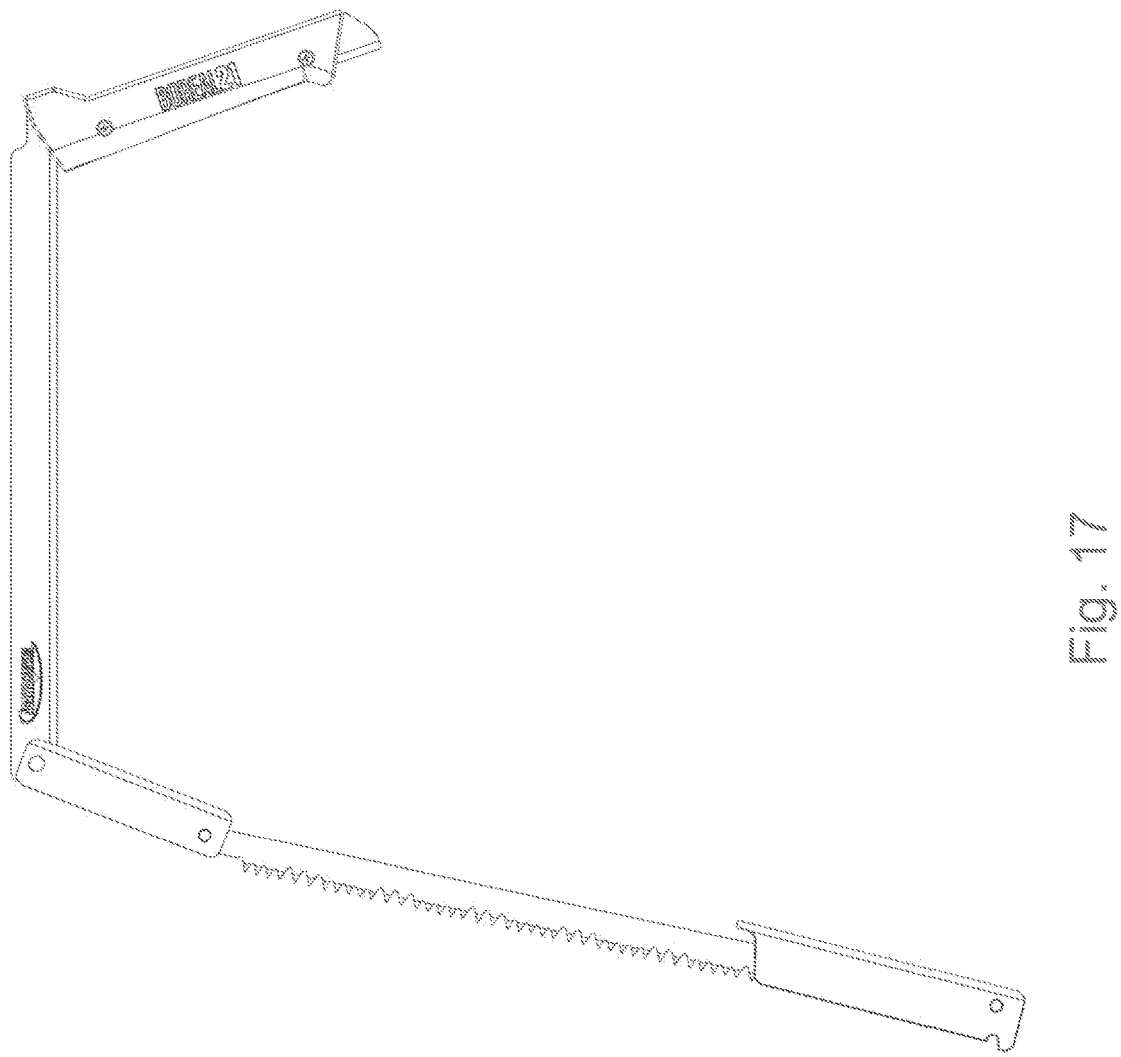
Figure 18:
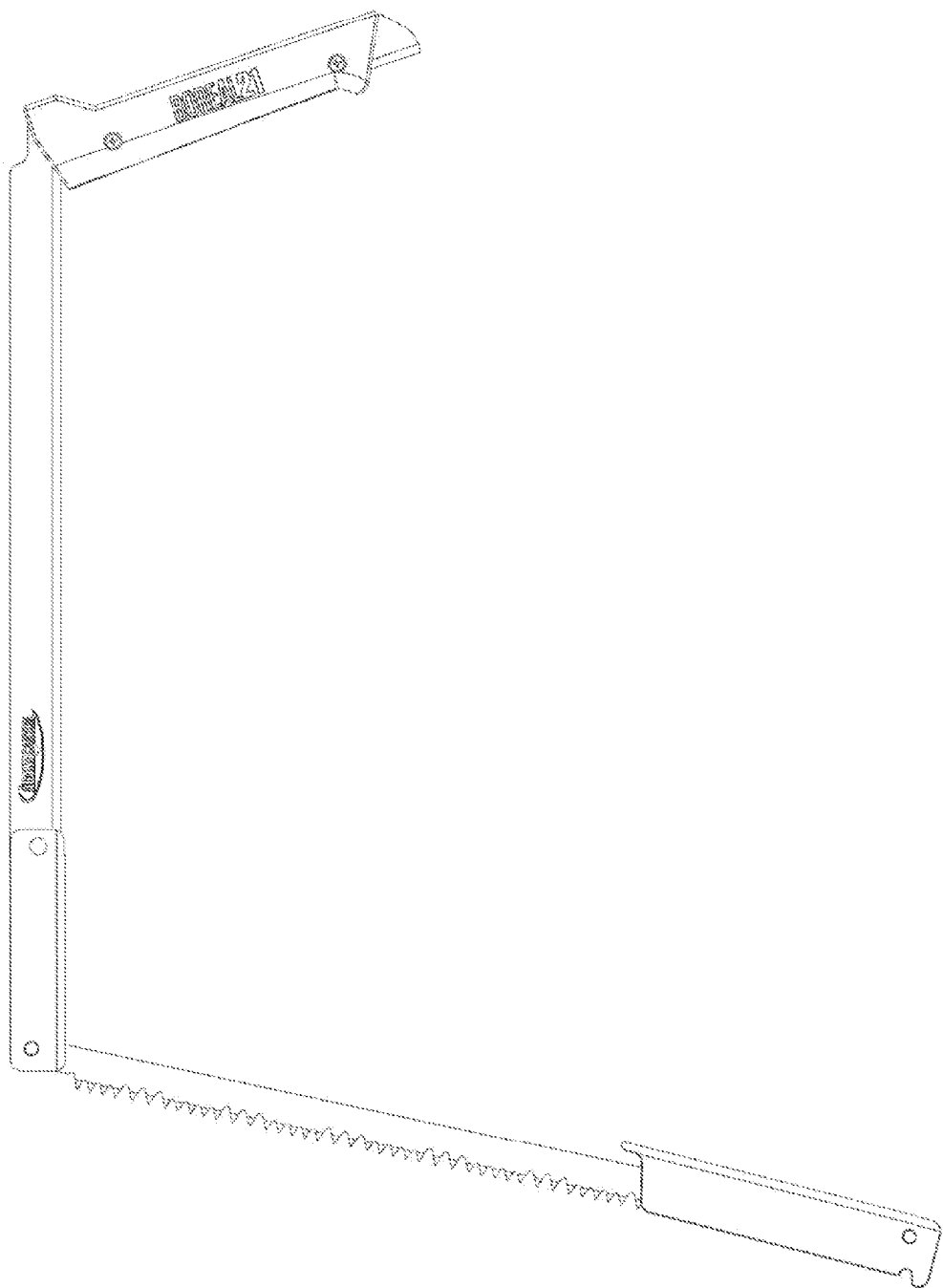
Figure 19:
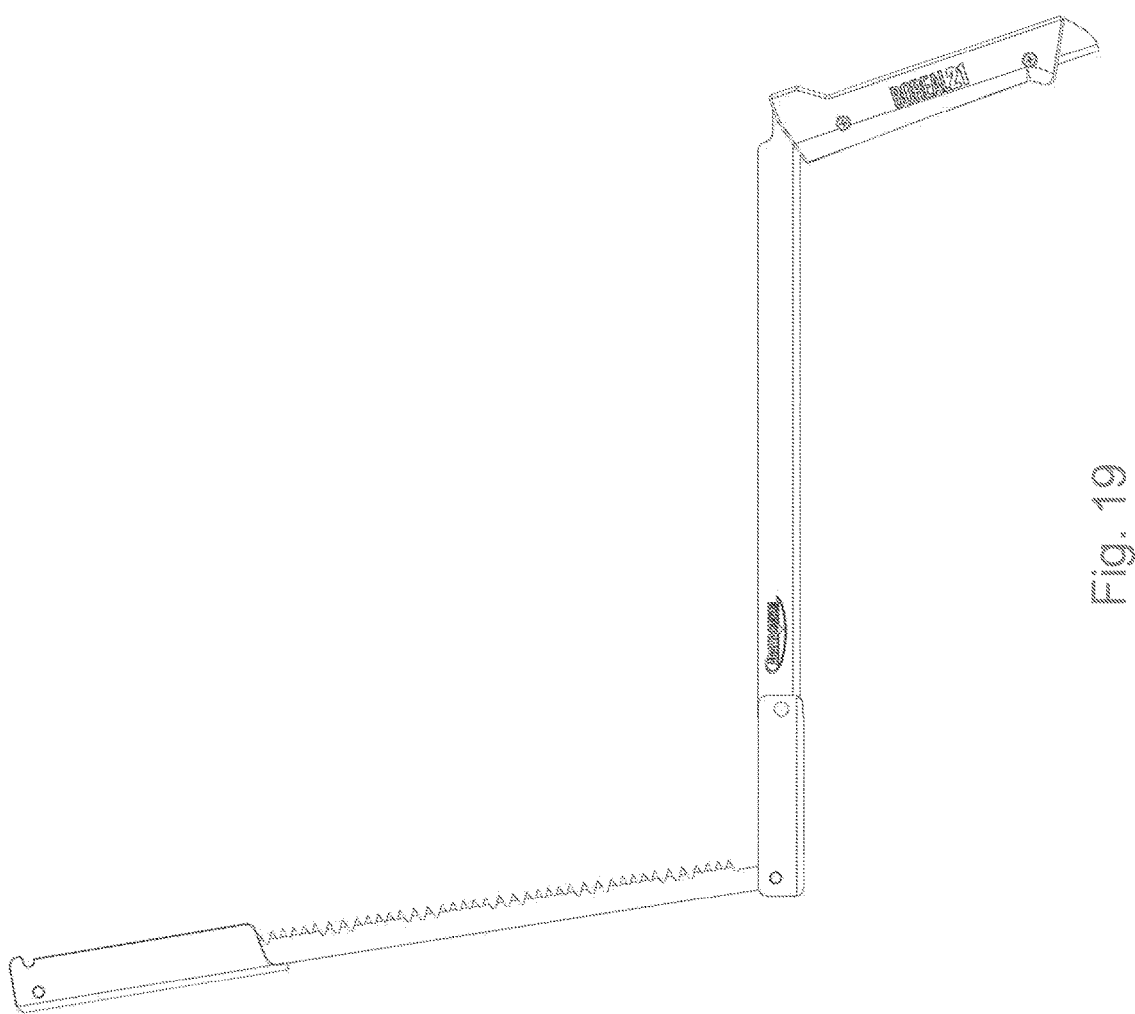
Figure 20:
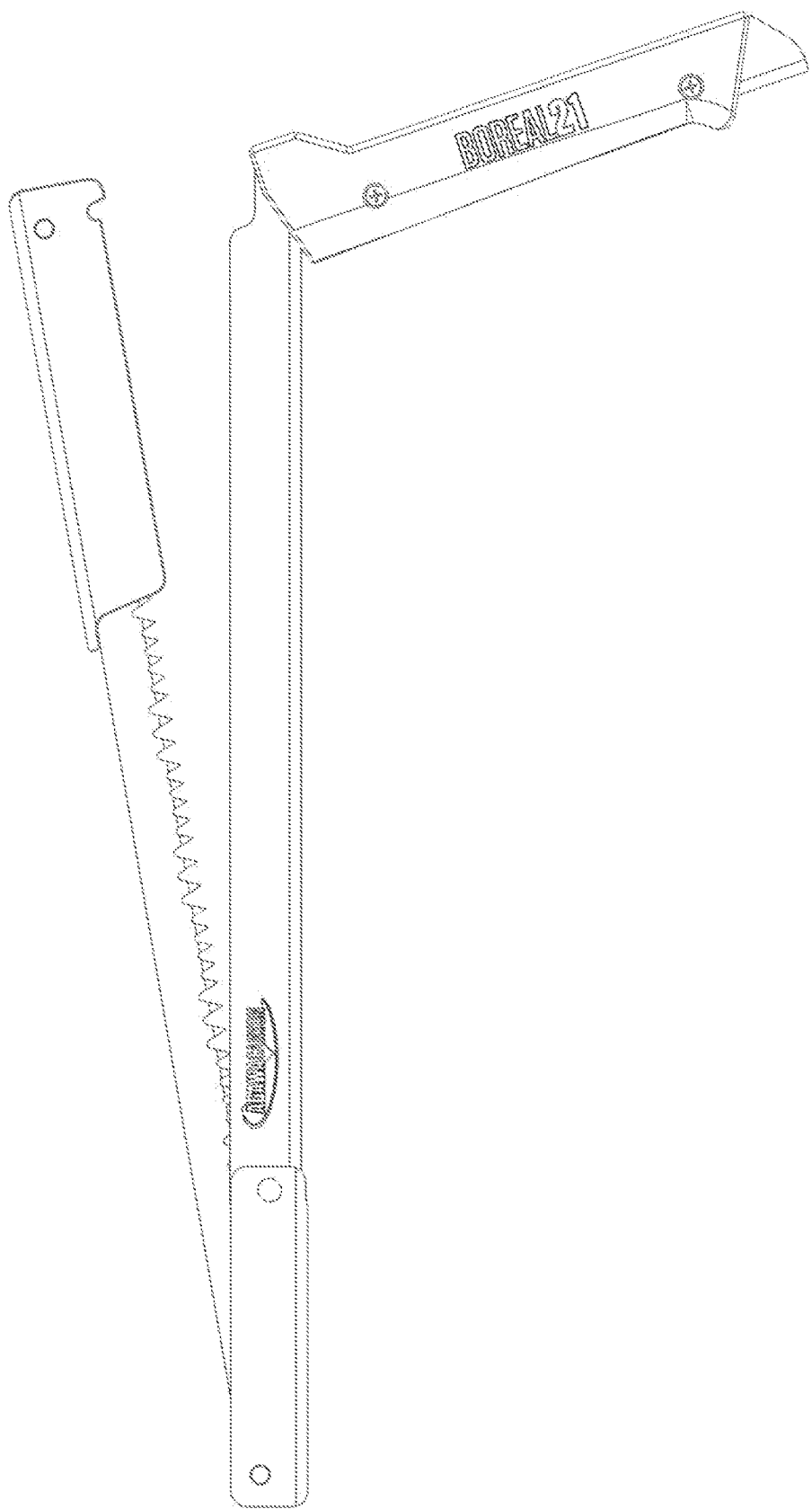
Figure 21:
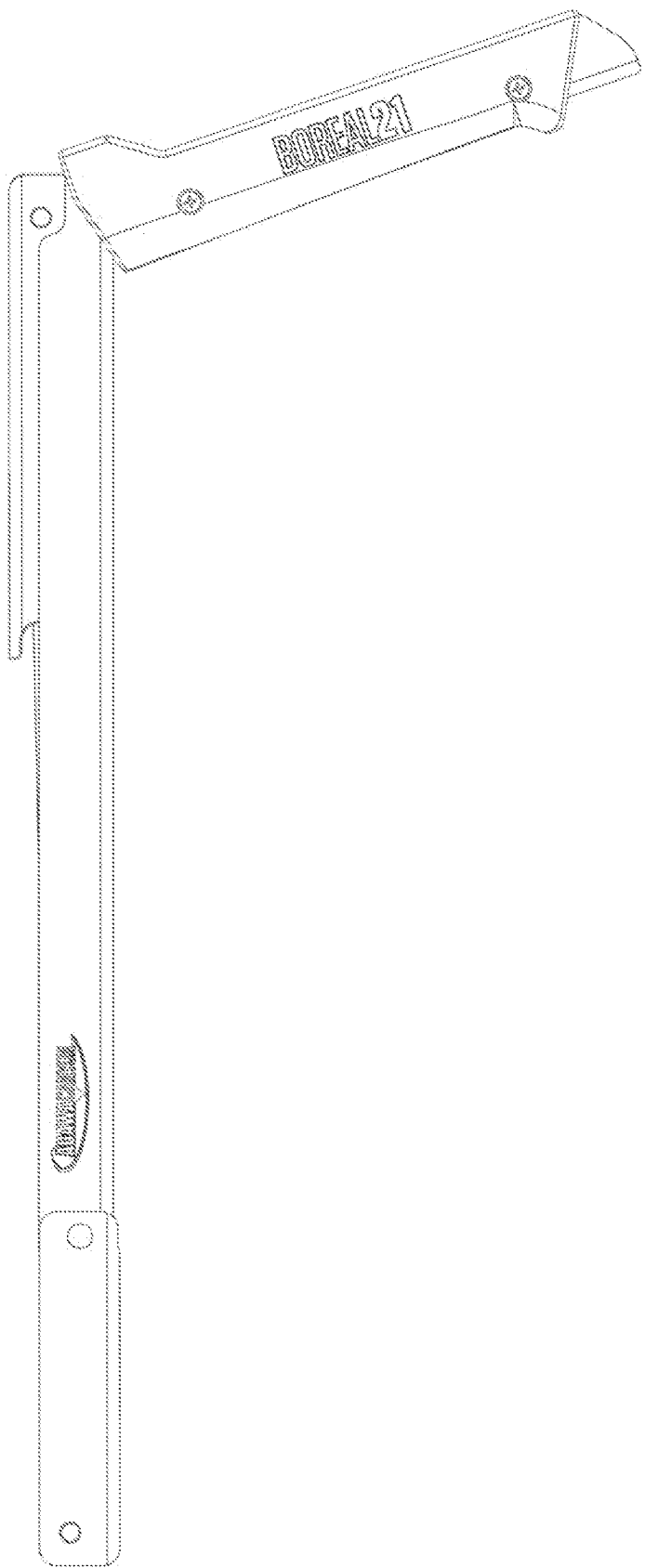
Figure 22:
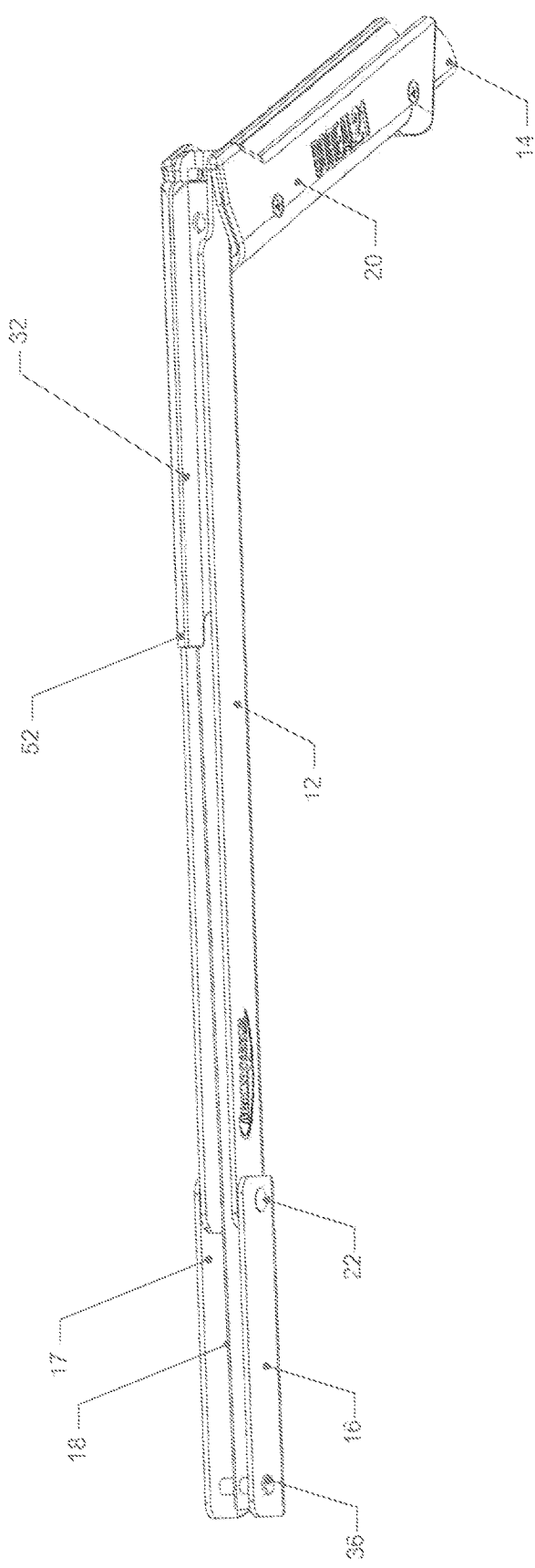
Figure 23:
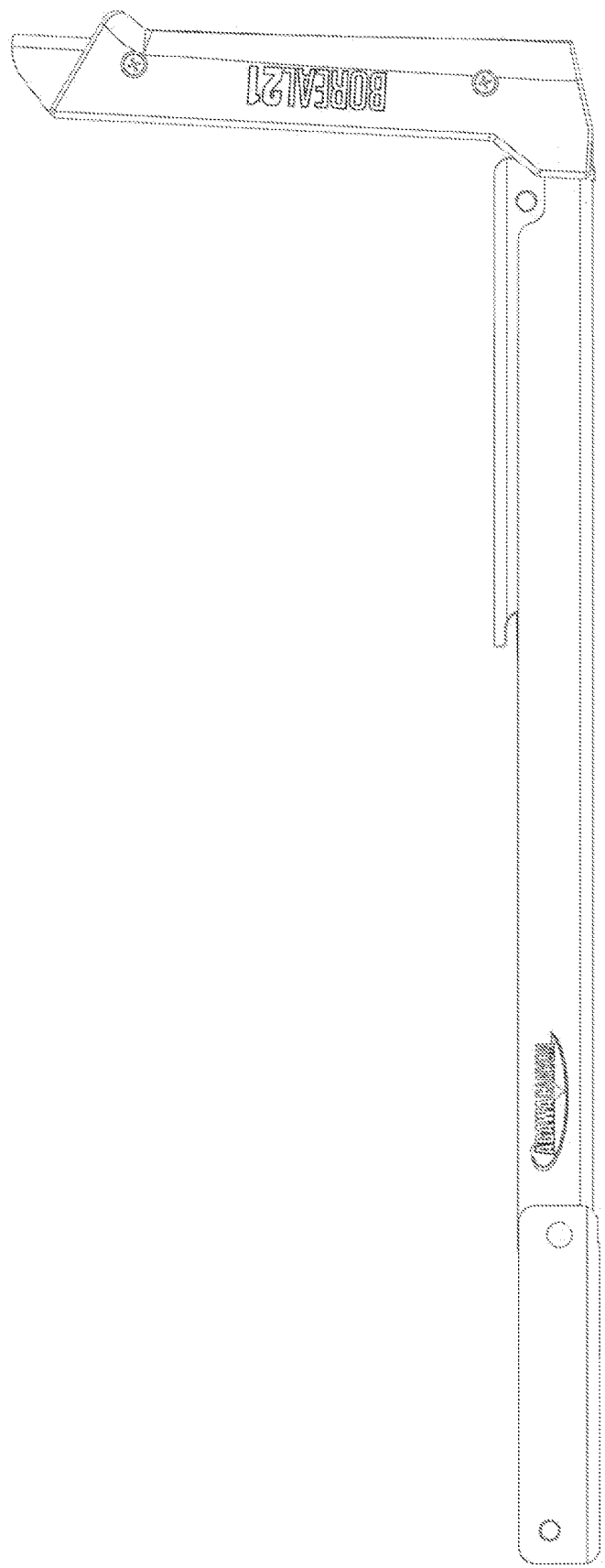

Proceeding from the configuration shown in FIG. 16, and by holding and manipulating lever arm 32, saw blade 18 is rotated about pivot pin 30 connecting saw blade 18 to short arm 16 to the position shown in FIG. 17, short arm 16 is rotated to be in line with top bar 12 as shown in FIG. 18, and saw blade 18 continues to be rotated about pivot pin 30 through the positions shown in FIGS. 19 and 20 to the position shown in FIGS. 21 and 22 wherein the saw blade 18 and the lever arm 32 are received in the open channels of short arm 16 and top bar 12. In this position, saw blade 18 is completely received within the short arm 16 and top bar 12 with the saw teeth facing into the channel. From this position, handle area 14 is rotated about pivot pin 24 through the position shown in FIG. 23 to completely folded packable condition shown in FIG. 2, with the handle arm closing over the top bar end portion as shown in FIG. 2. In this position, saw blade 18 is completely sheathed within the folded assembly so is not exposed to cause damage to a person holding the folded assembly or to a container or case holding the folded assembly. Handle arm 14 can be sized and configured to tightly fit over the end portion of top bar 12 to hold the assembly in folded condition or may loosely fit over the end portion of top bar 12 and be held in folded condition by other ax ins such as by a case, catch, or even an elastic band. Similarly, lever arm 32 may be sized and configure to tightly fit into the end portion of top bar 12 or fit loosely therein and held in position by handle arm 14 when swung into position over top arm 12 as shown in FIG. 2.

For the most compact folded condition, the length of the folded assembly should be as close as possible to the length of the saw blade while still completely sheathing the saw blade. It should be noted from FIGS. 20-23 and FIG. 2 that a minimum length can be achieved by making the lengths of top bar 12 and short arm 16 such that when arranged in line as shown in such FIGS., the total length of the in line arms is just long enough to allow the end of the lever at to fit within the channel of the top bar without hitting pivot pin 24 connecting the handle arm to the top bar. It has been found that with this construction and using a twenty one inch long blade, the folded assembly can be as short as just 21.625 inches. For this construction, the pivot pin 22 pivotally connecting short arm 16 to top bar 12 should be a two part pin that does not extend through the entire open channel of the top bar, but leaves an opening between the two parts sufficient to allow the saw blade to fit between the two parts into the channel.

Set up of the saw from the closed packable condition to the open functional saw condition is the opposite of the take down. Thus, the set up proceeds from the packable condition shown in FIG. 2, through the steps shown in reverse order from FIG. 21 to FIG. 8.

While the fulcrum surface has been shown and described as an end surface of the handle arm web, the fulcrum surface can take various other forms, such as a shah or pin projection associated with the handle arm, and the fulcrum surface receiver can be of any shape or form to receive the fulcrum surface and to be able to pivot or rotate about the fulcrum surface. Further, the fulcrum surface and the fulcrum surface receiver can be made of various materials or coated with various materials to improve the strength and durability of the fulcrum surface and the fulcrum surface receiver and improve their operation. It should be noted that as used in this disclosure, the fulcrum surface is considered as being the stationary surface on the handle arm and the fulcrum receiving surface is considered as the rotating surface on the lever arm mating with the fulcrum surface on the handle arm. The labels do not dictate the shape of each surface. Thus, the fulcrum surface on the handle arm could be a notch or other indentation which is received over a projection extending from the lever arm as the fulcrum surface receiver. In such case, the projection on the lever arm i.e., the fulcrum surface receiver, still rotates about the notch or indentation in the handle arm, i.e., the fulcrum surface.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A foldable bow saw movable between a set up functional saw condition and a taken down folded packable condition, comprising:
   a handle arm;
   a top bar;
   a short arm;
   a saw blade; and
   a lever arm, said handle arm, top bar, short arm, saw blade, and lever arm all pivotally connected one to the other as a one piece assembly with an end of the handle arm and an end of the lever arm forming free, unconnected ends of the assembly;
   a fulcrum surface associated with the free end of the handle arm; and a fulcrum surface receiver adjacent an end of the lever arm which is pivotally connected to the saw blade and adapted to removably receive the fulcrum surface therein during set up and take down of the saw, said lever arm being rotatable about the fulcrum surface when the fulcrum surface is received by the fulcrum surface receiver, and said lever arm having a pivotal connection to the saw blade positioned with respect to the fulcrum surface receiver whereby, dating set up of the saw, when the fulcrum surface is received by the fulcrum surface receiver, rotation of the lever arm in a locking direction about the fulcrum surface moves the pivotal connection of the lever arm to the saw blade to a tensioned conditioned wherein the lever arm is held against the handle arm to hold the saw in set up functional saw condition, and when in set up functional saw condition, rotation of the lever arm in an unlocking direction moves the pivotal connection of the lever arm to the saw blade to an untensioned condition allowing the fulcrum surface to be removed from the fulcrum surface receiver and the assembly to be folded to the packable condition.

2. A foldable bow saw according to claim 1, wherein the handle arm, top bar, short arm, and lever arm are of channel construction whereby when in folded condition, the saw blade is sheathed within the channels.

3. A foldable bow saw according to claim 2, wherein the saw blade has a length, the top bar has a length, and the short at has a length, wherein the length of the top arm and the short at together when pivoted to an in line configuration is greater than the length of the saw blade, and wherein the saw blade can be pivoted about an end of the short arm to be received in the channels of the in line configuration of the top bar and short arm to completely sheath the saw blade.

4. A foldable bow saw according to claim 3, wherein the length of the top arm and the short arm together when pivoted to an in line configuration is about 1.036 times the length of the saw blade.

5. A foldable bow saw according to claim 4, wherein the lever arm can be pivoted about an end of the saw blade so that an end portion of the saw blade is sheathed within the lever arm channel thereby allowing the saw blade to be held and manipulated by a user holding the lever arm and without touching the saw blade.

6. A foldable bow saw according to claim 5, wherein the handle arm, top bar, and short arm each have a channel web and wherein, when in functional saw condition, the handle arm is pivoted about the top bar until an end edge of the channel web of the handle arm abuts a web outer surface of the top bar to prevent further movement of the handle arm with respect to the top bar, and the short arm is pivoted about the top bar until an end edge of the channel web of the short arm abuts a web outer surface of the top bar to prevent further movement of the short arm with respect to the top bar, and the saw blade extends under tension between opposite ends of the handle arm and short arm.

7. A foldable bow saw according to claim 6, wherein the web outer surface of the top bar has a configuration, and wherein the end edge of the channel web of the handle arm and end edge of the channel web or the short arm each have an opposite configuration from the configuration of the web outer surface of the top bar so that when the end edge of the channel web of the handle arm abuts the web outer surface of the top bar the opposite configurations will mate and when the end edge of the channel web of the short arm abuts a web outer surface of the top bar the opposite configurations will mate.

8. A foldable bow saw according to claim 7, wherein the configuration of the web outer surface of the top bar includes a flat portion with opposite side edges convexly radiused, and the opposite configurations of the end edge of the channel web of the handle arm and end edge of the channel web of the short arm each have a flat portion to align with and mate with the flat portion of the web outer surface of the top bar and each of the opposite configurations of the end edge of the channel web of the handle arm and end edge of the channel web of the short arm each have concavely radiused portions at opposite ends of the flat portion to abut and mate with the convexly radiused opposite side edges of the web outer surface of the top bar.

9. A foldable bow saw according to claim 2, wherein the lever arm can be pivoted about an end of the saw blade so that an end portion of the saw blade is sheathed within the lever arm channel thereby allowing the saw blade to be held and manipulated by a user holding the lever arm and without touching the as blade.

10. A foldable bow saw according to claim 2, wherein the fulcrum surface is an end surface of the free end of the handle arm.

11. A foldable bow saw according to claim 10, wherein the fulcrum surface receiver is a notch associated with the lever arm adapted to receive the fulcrum surface.

12. A foldable bow saw according to claim 2, additionally including a handle grip cover on the handle arm to provide a comfortable grip surface for a user of the saw.

13. A foldable bow saw according to claim 1, wherein the fulcrum surface is an end surface of the free end of the handle arm.

14. A foldable bow saw according to claim 13, wherein the fulcrum surface receiver is a notch associated with the lever arm adapted to receive the fulcrum surface.

15. A foldable bow saw according to claim 1, wherein movement of the pivotal connection to the saw blade to a tensioned conditioned wherein the lever arm is held against the handle arm occurs after movement of the pivotal connection to the it blade through a position of maximum tension.

16. A foldable bow saw according to claim 1, wherein the handle arm, top bar, and short arm are of channel construction each having a channel web whereby when in functional saw condition, the handle arm is pivoted about the top bar until an end edge of the channel web of the handle arm abuts a web outer surface of the top bar to prevent further movement of the handle arm with respect to the top bar, and the short arm is pivoted about the top bar until an end edge of the channel web of the short arm abuts a web outer surface of the top bar to prevent further movement of the short arm with respect to the top bar, and the saw blade extends under tension between opposite ends of the handle arm and short arm.

17. A foldable bow saw according to claim 16, wherein the web outer surface of the top bar has a configuration, and wherein the end edge of the channel web of the handle arm and end edge of the channel web of the short arm each have an opposite configuration from the configuration of the web outer surface of the top bar so that when the end edge of the channel web of the handle arm abuts the web outer surface of the top bar the opposite configurations will mate and when the end edge of the channel web of the short arm abuts a web outer surface of the top bar the opposite configurations will mate.

18. A foldable bow saw according to claim 17, wherein the configuration of the web outer surface of the top bar includes a flat portion with opposite side edges convexly radiused, and the opposite configurations of the end edge of the channel web of the handle arm and end edge of the channel web of the short arm each have a flat portion to align with and mate with the flat portion of the web outer surface of the top bar and each of the opposite configurations of the end edge of the channel web of the handle arm and end edge of the channel web of the short arm each have concavely radiused portions at opposite ends of the flat portion to abut and mate with the convexly radiused opposite side edges of the web outer surface of the top bar.

19. A foldable bow saw according to claim 1, additionally including a handle grip cover on the handle arm to provide a comfortable grip surface for a user of the saw.

* * * * *